(12) United States Patent
Ogawa et al.

(10) Patent No.: US 11,575,331 B2
(45) Date of Patent: Feb. 7, 2023

(54) SERIAL MULTIPLEX INVERTER CONTROL DEVICE

(71) Applicant: MEIDENSHA CORPORATION, Tokyo (JP)

(72) Inventors: Ryuichi Ogawa, Numazu (JP); Masashi Takiguchi, Fuji (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/640,537

(22) PCT Filed: Jun. 3, 2020

(86) PCT No.: PCT/JP2020/021853
§ 371 (c)(1),
(2) Date: Mar. 4, 2022

(87) PCT Pub. No.: WO2021/044681
PCT Pub. Date: Mar. 11, 2021

(65) Prior Publication Data
US 2022/0337174 A1    Oct. 20, 2022

(30) Foreign Application Priority Data
Sep. 6, 2019   (JP) .............................. JP2019-162520

(51) Int. Cl.
*H02M 7/537* (2006.01)
*H02M 7/49* (2007.01)
(Continued)

(52) U.S. Cl.
CPC ......... *H02M 7/537* (2013.01); *H02M 1/0003* (2021.05); *H02M 7/217* (2013.01);
(Continued)

(58) Field of Classification Search
CPC ...... H02M 1/0003; H02M 7/217; H02M 7/49; H02M 7/5387; H02M 7/539
See application file for complete search history.

(56) References Cited

U.S. PATENT DOCUMENTS 4,476,520 A * 10/1984 Gallemore ............ H02M 7/483
363/43
4,591,965 A * 5/1986 Dickerson ............... H02M 7/49
363/43
(Continued)

FOREIGN PATENT DOCUMENTS

JP          3316801 B2    8/2002
JP       2006-109688 A    4/2006
(Continued)

OTHER PUBLICATIONS

A-Ch. Rufer, "An aid in the teaching of multilevel inverters for high power applications", Power Electronics Specialists Conference, 1995, PESC '95 Record., 26th Annual IEEE Conf., Atlanta, GA, USA, Jun. 18-22, 1995, New York, NY, USA, IEEE, US, vol. 1, Jun. 18, 1995, pp. 347-352.

(Continued)

*Primary Examiner* — Yusef A Ahmed
(74) *Attorney, Agent, or Firm* — Foley & Lardner LLP

(57) ABSTRACT

For a serial multiplex inverter in which each phase includes cells connected serially, wherein each cell includes switching elements and is configured to output a level of +1 (ON), a level of zero (OFF), and a level of −1 (ON) as output levels by operation of the switching elements, a control device includes a switching load distribution control section. This control section is configured to: store information about an ON-output duration of each of the cells and information about an OFF-output duration of each of the cells; for a shift pattern from ON to OFF in the cells, put OFF a gate signal for one of the cells whose ON-output duration is the longest (Continued)

of the cells; and for a shift pattern from OFF to ON in the cells, put ON a gate signal for one of the cells whose OFF-output duration is the longest of the cells.

4 Claims, 25 Drawing Sheets

(51) Int. Cl.
    *H02M 1/00*     (2006.01)
    *H02M 7/217*     (2006.01)
    *H02M 7/48*     (2007.01)
    *H02M 7/5387*     (2007.01)

(52) U.S. Cl.
    CPC ............ *H02M 7/48* (2013.01); *H02M 7/49* (2013.01); *H02M 7/5387* (2013.01)

(56) References Cited

U.S. PATENT DOCUMENTS

| | | | | |
|---|---|---|---|---|
| 4,739,240 | A * | 4/1988 | MacMinn | H02P 25/0925 318/811 |
| 5,408,499 | A * | 4/1995 | Sasaki | H04L 27/3433 714/778 |
| 5,642,275 | A * | 6/1997 | Peng | H02M 7/4835 363/58 |
| 7,164,254 | B2 * | 1/2007 | Kerkman | H02M 1/44 318/803 |
| 9,887,617 | B2 * | 2/2018 | Hasegawa | H02M 1/12 |
| 2003/0231517 | A1 * | 12/2003 | Bixel | H02M 5/4585 363/71 |
| 2008/0061728 | A1 * | 3/2008 | Tomigashi | H02M 7/217 318/801 |
| 2009/0185405 | A1 * | 7/2009 | Masukawa | H02M 1/12 363/131 |
| 2009/0302682 | A1 * | 12/2009 | Hammond | H02M 7/49 307/52 |
| 2012/0300523 | A1 * | 11/2012 | Sugiyama | H02M 1/15 363/131 |
| 2013/0070901 | A1 | 3/2013 | Grassl | |
| 2013/0223115 | A1 * | 8/2013 | Tsuchiya | H02M 7/4835 363/68 |
| 2013/0264974 | A1 * | 10/2013 | Suzuki | H02P 27/08 318/139 |
| 2014/0133198 | A1 * | 5/2014 | Koyama | H02J 3/1857 363/40 |
| 2014/0205865 | A1 * | 7/2014 | Matsuo | G01R 31/396 429/7 |
| 2015/0288284 | A1 * | 10/2015 | Lavieville | H02M 3/158 363/34 |
| 2016/0126862 | A1 * | 5/2016 | Vahedi | H02M 7/537 363/131 |
| 2016/0352230 | A1 * | 12/2016 | Norimatsu | H05K 7/20909 |
| 2017/0005472 | A1 * | 1/2017 | Son | H02M 7/4835 |
| 2020/0195125 | A1 * | 6/2020 | Slepchenkov | H02M 1/12 |
| 2020/0244076 | A1 * | 7/2020 | Wang | B60L 15/007 |
| 2020/0382019 | A1 * | 12/2020 | Miyamoto | H02M 7/49 |
| 2021/0067054 | A1 * | 3/2021 | Tanaka | H02M 5/4585 |
| 2021/0075338 | A1 * | 3/2021 | Tanaka | H02M 1/0043 |
| 2022/0209643 | A1 * | 6/2022 | Ogawa | H02M 7/48 |

FOREIGN PATENT DOCUMENTS

| | | |
|---|---|---|
| JP | 2006-320103 A | 11/2006 |
| JP | 2014-100026 A | 5/2014 |
| JP | 2017-017976 A | 1/2017 |
| JP | 2018-098960 A | 6/2018 |
| JP | 6856099 B2 | 4/2021 |

OTHER PUBLICATIONS

Extended European Search Report in European Patent Application 20859708.8 dated Sep. 22, 2022 (9 pages).

* cited by examiner

CELL: THREE-PHASE RECTIFIER AND SINGLE-PHASE INVERTER

FIG. 19
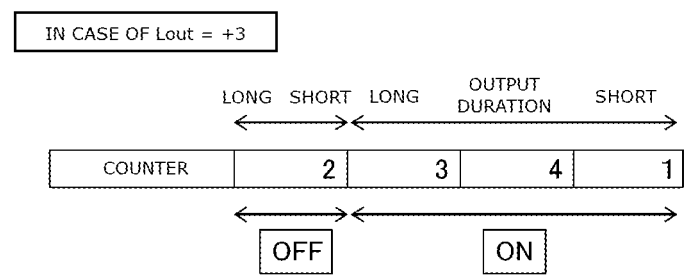
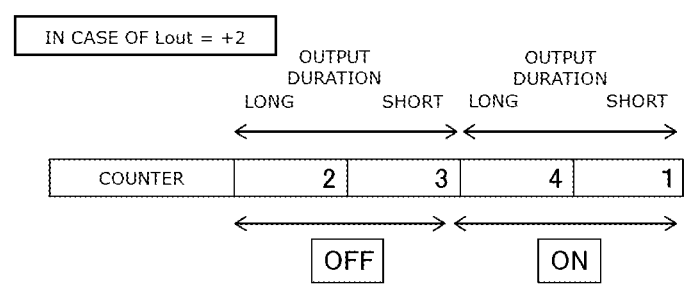

(4) GATE SIGNAL GENERATION

SERIAL MULTIPLEX INVERTER CONTROL DEVICE

TECHNICAL FIELD

The present invention relates to a control device for a serial multiplex inverter configured to output a voltage through inverters, and particularly relates to loss equalization control.

BACKGROUND ART

The following discusses a system in which an input three-phase AC voltage is converted into a DC voltage by a rectifier (AC-DC converter), and the DC voltage is outputted through an inverter in the form of an AC voltage having a desired frequency and a desired amplitude.

Such a system may employ a serial multiplex inverter in which multiple single-phase inverters are connected, in order to output a high voltage or a voltage having few harmonics. The serial multiplex inverter is also called a cascade H-bridge inverter or the like.

FIG. 1 shows an example of configuration of a main circuit of a serial multiplex inverter. The configuration of FIG. 1 includes N single-phase inverters connected in series in each phase, and is capable of outputting a phase voltage at 2N+1 levels. In the present description, this configuration is referred to as an N-stage serial multiplex inverter. In FIG. 1, an alternating current is converted into a direct current by a three-phase rectifier, and IGBTs constitute a single-phase inverter.

In the serial multiplex inverter, each single-phase inverter (henceforth referred to as a cell) can be switched independently, and switching timings can be combined alternately. Thereby, it is possible to form a device having a high switching frequency as a whole while suppressing the switching frequency of each cell.

FIG. 27 shows an example of switching of a serial multiplex inverter having a four-stage cell configuration. Switching timings of each cell are different from those of other cells, which does not unbalance a phase voltage, wherein the phase voltage is maintained to have a sinusoidal symmetry waveform. The switching frequency of the phase voltage is equal to the sum of the switching frequencies of the cells.

In a serial multiplex inverter, a phase voltage waveform can be expressed by various patterns of combination of waveforms of the cells. This high degree of freedom allows various control methods. However, since cell voltages cannot be uniquely determined from the phase voltage, the cell voltages may be outputted in an unbalanced manner depending on a selected control method.

An unbalance among the cell voltages means an unbalance in switching loss among the cells, and causes an increase in power consumption for cooling and a decrease in component life. In order to prevent a decrease in system efficiency and a decrease in life, it is required to consider a control for optimally distributing the load of each cell. In the following, a load related to unbalance among cell voltage outputs is referred to as a switching load of each cell, or simply as a switching load.

Practical switching load distribution controls have been studied, and two main directions have been presented.

The first direction is an improvement of PD (Phase Disposition) PWM method disclosed in a patent document 1. The PD method is implemented by performing a triangular wave comparison using carrier signals shifted to level regions and having the same phase. In the PD method, a line-to-line voltage does not shift by two steps, which provides a preferable voltage applied to a motor. However, there is a problem of unbalance in the switching load among the cells. Against the problem, patent document 1 achieves the same phase voltage waveform as the PD method, with balanced switching loading, by allocating a command voltage to the carrier signals of the cells.

The second direction is an improvement of PS (Phase Shift) PWM method disclosed in a patent document 2. The PS method is implemented by performing a triangular wave comparison using carrier signals having shifted phases. In the PS method, the switching load of each cell can be distributed with no additional special control, but a line-to-line voltage is likely to shift by two steps, and there is a problem about a voltage applied to a motor.

Against that problem, patent document 2 compensates for the drawback of two-step shift of the line-to-line voltage, while maintaining the advantage of distributed switching loading, by performing an operation of shifting the carrier signals in accordance with the voltage command.

As described above, with regard to triangular wave comparison PWM, the conventional approach is to consider a switching load distribution method in a control system in which switching load distribution is difficult, or to overcome a disadvantage in a control system in which switching load distribution is easy.

In addition, switching load distribution other than triangular wave comparison PWM is also being studied. In a patent document 3, regarding an output of a fixed pulse pattern having a predetermined phase, switching load distribution is performed by exchanging a voltage command for each cell in every PWM half cycle while maintaining the phase voltage output.

Patent documents 1 and 2 are premised on performing triangular wave comparison PWM. For example, no method of distributing the switching load of each cell has been studied for cases where modulation is implemented by a DTC (Direct Torque Control) that sets an optimum output level to follow a target torque, or modulation is implemented by a fixed pulse pattern method that outputs a table-designed level in synchronization with a fundamental wave phase.

Furthermore, in patent document 1, in order to achieve strict switching load distribution of each cell, it is required to store a carrier allocation pattern for each cell as a table, wherein creation of the table increases the cost.

Patent document 2 presents a cell voltage allocation derived from the PS method. In the PS method, when the slope of a command voltage near zero crossing is close to the slope of a carrier signal or exceeds the slope of the carrier signal, there is a problem that the command voltage near zero crossing is likely to continuously cross the carrier signal of the same cell and thereby cause a slight unbalance in the switching load.

Regarding the patent document 3, it is required to predetermine the voltage output for each cell before the switching load distribution control. In addition, it is based on the exchange of the voltage commands in the PWM half cycle, and it is impossible to comply with a control method that is not based on a PWM cycle, for example, a control method such as a comparator control that determines switching by comparison between a target to be evaluated and a threshold value.

In view of the foregoing, it is a problem to distribute the switching load among the cells in the control device for the serial multiplex inverter.

PRIOR ART DOCUMENT(S)

Patent Document(s)

Patent Document 1: Japanese Patent No. 3316801
Patent Document 2: Japanese Patent Application Publication No. 2006-109688
Patent Document 3: Japanese Patent Application Publication No. 2006-320103

SUMMARY OF INVENTION

The present invention has been made in view of the conventional problems described above. According to one aspect of the present invention, a control device for a serial multiplex inverter in which each of phases includes cells connected serially, the control device includes: a high level control section configured to produce a level command based on a command value; and a switching load distribution control section configured to: store information about an ON-output duration of each of the cells and information about an OFF-output duration of each of the cells; for a shift pattern from ON to OFF in the cells, put OFF a gate signal for one of the cells whose ON-output duration is the longest of the cells; and for a shift pattern from OFF to ON in the cells, put ON a gate signal for one of the cells whose OFF-output duration is the longest of the cells; wherein each of the cells is defined as being ON when the each of the cells is equal in output level to a level of +1 or a level of −1; and wherein each of the cells is defined as being OFF when the each of the cells is equal in output level to a level of zero.

According to one aspect of the present invention, the control device is configured wherein the switching load distribution control section is configured to: perform a pattern determination operation based on the level command and an output level, wherein the pattern determination operation is to select one of a pattern A, a pattern B, and a pattern C, wherein the pattern A is to cause a shift from OFF to ON in the cells, wherein the pattern B is to cause a shift from ON to OFF in the cells, and wherein the pattern C is to cause no level shift; perform a counter calculation operation to process the information about the ON-output duration and the information about the OFF-output duration, based on the selected pattern; and perform a gate signal generation operation to generate a gate signal, based on the information about the ON-output duration and the information about the OFF-output duration.

According to another aspect of the present invention, the control device is configured wherein the switching load distribution control section is configured to: perform a pattern determination operation based on the level command and an output level, wherein the pattern determination operation is to select one of a pattern A, a pattern B, and a pattern C, wherein the pattern A is to cause a shift from OFF to ON in the cells, wherein the pattern B is to cause a shift from ON to OFF in the cells, and wherein the pattern C is to cause no level shift; perform a counter calculation operation to process the information about the ON-output duration and the information about the OFF-output duration, based on the selected pattern; repeat the counter calculation operation when the level command and the output level are different from each other by two or more levels; and perform a gate signal generation operation to generate a gate signal, based on the information about the ON-output duration and the information about the OFF-output duration.

According to one aspect of the present invention, the control device is configured wherein: the counter calculation operation is implemented by: providing an ON-counter as the information about the ON-output duration and an OFF-counter as the information about the OFF-output duration for each of the cells, wherein a value of the ON-counter indicates a duration of output, and wherein a value of the OFF-counter indicates a duration of output; for the pattern A, setting to zero the OFF-counter of one of the cells whose OFF-counter is the largest of the cells, setting to 1 the ON-counter of the one of the cells whose OFF-counter is the largest of the cells, incrementing the ON-counter of each of the cells whose ON-counter has a positive value, and incrementing the OFF-counter of each of the cells whose OFF-counter has a positive value; for the pattern B, setting to zero the ON-counter of one of the cells whose ON-counter is the largest of the cells, setting to 1 the OFF-counter of the one of the cells whose ON-counter is the largest of the cells, incrementing the ON-counter of each of the cells whose ON-counter has a positive value, and incrementing the OFF-counter of each of the cells whose OFF-counter has a positive value; and for the pattern C, incrementing the ON-counter of each of the cells whose ON-counter has a positive value, and incrementing the OFF-counter of each of the cells whose OFF-counter has a positive value; and the gate signal generation operation is implemented by generating a gate signal to put ON each of the cells whose ON-counter is positive, and generating a gate signal to put OFF each of the cells whose ON-counter is equal to zero.

According to another aspect of the present invention, the control device is configured wherein: the counter calculation operation is implemented by: providing a counter for each of the cells, wherein an absolute value of the counter indicates a duration of output, wherein the counter indicates an ON-output when the counter is positive, and wherein the counter indicates an OFF-output when the counter is negative; for the pattern A, setting to 1 the counter of one of the cells whose counter is the smallest of the cells, incrementing the counter of each of the cells whose counter has a positive value, and decrementing the counter of each of the cells whose counter has a negative value; for the pattern B, setting to −1 the counter of one of the cells whose counter is the largest of the cells, incrementing the counter of each of the cells whose counter has a positive value, and decrementing the counter of each of the cells whose counter has a negative value; and for the pattern C, incrementing the counter of each of the cells whose counter has a positive value, and decrementing the counter of each of the cells whose counter has a negative value; and the gate signal generation operation is implemented by generating a gate signal to put ON each of the cells whose counter is positive, and generating a gate signal to put OFF each of the cells whose counter is negative.

According to another aspect of the present invention, the control device is configured wherein: the counter calculation operation is implemented by: providing an ON-counter as the information about the ON-output duration and an OFF-counter as the information about the OFF-output duration for each of the cells, wherein a value of the ON-counter indicates a duration of output, and wherein a value of the OFF-counter indicates a duration of output; for the pattern A, setting to zero the OFF-counter of one of the cells whose OFF-counter is the largest of the cells, setting to 1 the ON-counter of the one of the cells whose OFF-counter is the largest of the cells, and incrementing the ON-counter of each of the cells whose ON-counter has a positive value; for the pattern B, setting to zero the ON-counter of one of the cells whose ON-counter is the largest of the cells, setting to 1 the OFF-counter of the one of the cells whose ON-counter is the largest of the cells, and incrementing the OFF-counter of each of the cells whose OFF-counter has a positive value; and for the pattern C, performing no operation; and the gate signal generation operation is implemented by generating a gate signal to put ON each of the cells whose ON-counter is positive, and generating a gate signal to put OFF each of the cells whose ON-counter is equal to zero.

According to another aspect of the present invention, the control device is configured wherein: the counter calculation operation is implemented by: providing a counter for each of the cells, wherein an absolute value of the counter indicates a duration of output, wherein the counter indicates an ON-output when the counter is positive, and wherein the counter indicates an OFF-output when the counter is negative; for the pattern A, setting to 1 the counter of one of the cells whose counter is the smallest of the cells, and incrementing the counter of each of the cells whose counter has a positive value; for the pattern B, setting to −1 the counter of one of the cells whose counter is the largest of the cells, and decrementing the counter of each of the cells whose counter has a negative value; and for the pattern C, performing no operation; and the gate signal generation operation is implemented by generating a gate signal to put ON each of the cells whose counter is positive, and generating a gate signal to put OFF each of the cells whose counter is negative.

According to another aspect of the present invention, the control device is configured wherein: the counter calculation operation is implemented by: providing an ON-counter as the information about the ON-output duration and an OFF-counter as the information about the OFF-output duration, wherein the ON-counter is an array in which each of the cells being ON is arranged in a descending order of the ON-output duration, and wherein the OFF-counter is an array in which each of the cells being OFF is arranged in a descending order of the OFF-output duration; for the pattern A, moving one of the cells arranged in the OFF-counter whose OFF-output duration is the largest of the cells to a position next to the last one of the cells in the ON-counter, and shifting by one column the remaining cells arranged in the OFF-counter in a direction where the OFF-output duration increases; for the pattern B, moving one of the cells arranged in the ON-counter whose ON-output duration is the largest of the cells to a position next to the last one of the cells in the OFF-counter, and shifting by one column the remaining cells arranged in the ON-counter in a direction where the ON-output duration increases; and for the pattern C, performing no operation; and the gate signal generation operation is implemented by generating a gate signal to put ON each of the cells arranged in the ON-counter, and generating a gate signal to put OFF each of the cells not arranged in the ON-counter.

According to another aspect of the present invention, the control device is configured wherein: the counter calculation operation is implemented by: providing a counter as the information about the ON-output duration and the information about the OFF-output duration, wherein the counter is an array including an OFF-region and an ON-region, wherein each of the cells being OFF is arranged in a descending order of the OFF-output duration in the OFF-region, and wherein each of the cells being ON is arranged in a descending order of the ON-output duration in the ON-region; for the pattern A, moving one of the cells arranged in the OFF-region whose OFF-output duration is the largest of the cells to a rearmost position in the ON-region, shifting by one column the remaining cells in a direction where the output duration increases, and shifting a boundary between the OFF-region and the ON-region in a direction to reduce the OFF-region by one and increase the ON-region by one; for the pattern B, shifting the boundary between the OFF-region and the ON-region in a direction to increase the OFF-region by one and reduce the ON-region by one; and for the pattern C, performing no operation; and the gate signal generation operation is implemented by generating a gate signal to put ON each of the cells arranged in the ON-region, and generating a gate signal to put OFF each of the cells not arranged in the ON-region.

According to another aspect of the present invention, the control device is configured wherein: the counter calculation operation is implemented by: providing a counter as the information about the ON-output duration and the information about the OFF-output duration, wherein the counter is an array including an OFF-region and an ON-region, wherein each of the cells being OFF is arranged in a descending order of the OFF-output duration in the OFF-region, and wherein each of the cells being ON is arranged in a descending order of the ON-output duration in the ON-region; for the pattern A, shifting a boundary between the OFF-region and the ON-region in a direction to increase the ON-region by one and reduce the OFF-region by one; for the pattern B, moving one of the cells arranged in the ON-region whose ON-output duration is the largest of the cells to a rearmost position in the OFF-region, shifting by one column the remaining cells in a direction where the output duration increases, and shifting the boundary between the OFF-region and the ON-region in a direction to reduce the ON-region by one and increase the OFF-region by one; and for the pattern C, performing no operation; and the gate signal generation operation is implemented by generating a gate signal to put ON each of the cells arranged in the ON-region, and generating a gate signal to put OFF each of the cells not arranged in the ON-region.

According to another aspect of the present invention, the control device is configured wherein: the counter calculation operation is implemented by: providing a counter as the information about the ON-output duration and the information about the OFF-output duration, wherein the counter is an array including an OFF-region and an ON-region, wherein each of the cells being OFF is arranged in a descending order of the OFF-output duration in the OFF-region, and wherein each of the cells being ON is arranged in a descending order of the ON-output duration in the ON-region; for the pattern A, when a priority change switch is set to zero, moving one of the cells arranged in the OFF-region whose OFF-output duration is the largest of the cells to a rearmost position in the ON-region, when the priority change switch is set to 1, moving one of the cells arranged in the OFF-region whose OFF-output duration is the second largest of the cells to the rearmost position in the ON-region, and shifting the remaining cells in a direction where the output duration increases, and shifting a boundary between the OFF-region and the ON-region in a direction to reduce the OFF-region by one and increase the ON-region by one; for the pattern B, shifting the boundary between the OFF-region and the ON-region in a direction to increase the OFF-region by one and reduce the ON-region by one; and for the pattern C, performing no operation; and the gate signal generation operation is implemented by generating a gate signal to put ON each of the cells arranged in the ON-region, and generating a gate signal to put OFF each of the cells not arranged in the ON-region.

According to another aspect of the present invention, the control device is configured wherein: the counter calculation operation is implemented by: providing a counter as the information about the ON-output duration and the information about the OFF-output duration, wherein the counter is an array including an OFF-region and an ON-region, wherein each of the cells being OFF is arranged in a descending order of the OFF-output duration in the OFF-region, and wherein each of the cells being ON is arranged in a descending order of the ON-output duration in the ON-region; for the pattern A, shifting a boundary between the OFF-region and the ON-region in a direction to increase the ON-region by one and reduce the OFF-region by one; for the pattern B, when a priority change switch is set to zero, moving one of the cells arranged in the ON-region whose ON-output duration is the largest of the cells to a rearmost position in the OFF-region, when the priority change switch is set to 1, moving one of the cells arranged in the ON-region whose ON-output duration is the second largest of the cells to the rearmost position in the OFF-region, and shifting by one column the remaining cells in a direction where the output duration increases, and shifting the boundary between the OFF-region and the ON-region in a direction to reduce the ON-region by one and increase the OFF-region by one; and for the pattern C, performing no operation; and the gate signal generation operation is implemented by generating a gate signal to put ON each of the cells arranged in the ON-region, and generating a gate signal to put OFF each of the cells not arranged in the ON-region.

According to another aspect of the present invention, the control device is configured wherein the switching load distribution control section is configured to, under a predetermined condition, for a pattern to cause a shift from ON to OFF in the cells, put OFF a gate signal for one of the cells whose ON-output duration is not the longest of the cells, for a pattern to cause a shift from OFF to ON in the cells, put ON a gate signal for one of the cells whose OFF-output duration is not the longest of the cells.

According to the present invention, it is possible to distribute the switching load among the cells in the control device of the serial multiplex inverter.

BRIEF DESCRIPTION OF DRAWINGS

FIG. 19 is an explanatory diagram showing a concept of a counter according to the sixth embodiment.

MODE(S) FOR CARRYING OUT INVENTION

Figure 1:
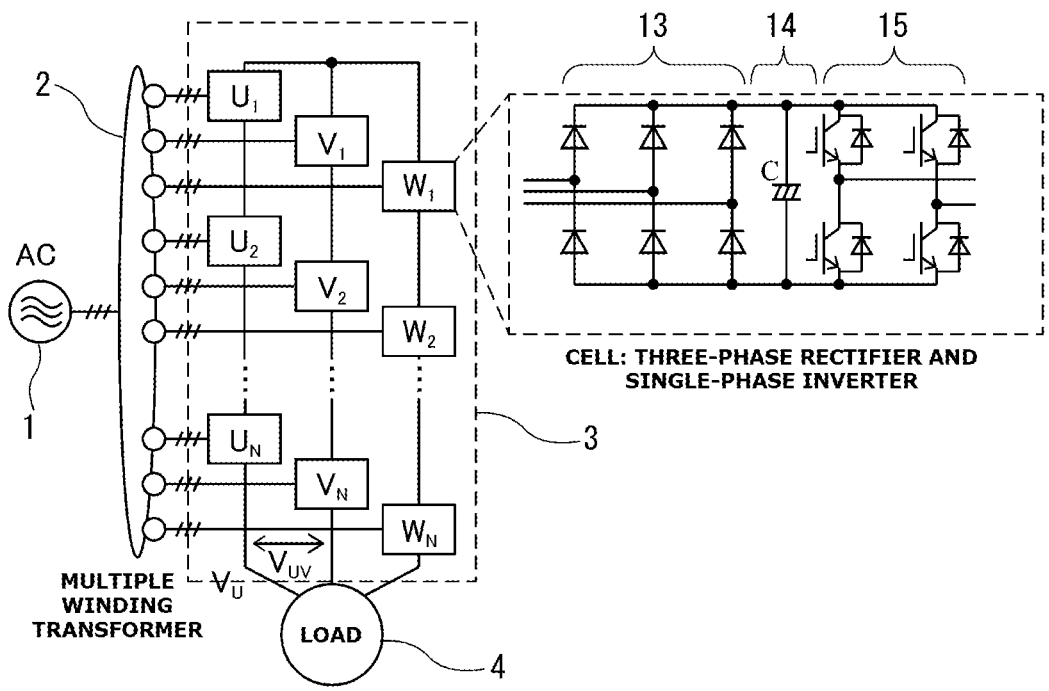
FIG. 1 is a schematic diagram showing an example of configuration of a main circuit of a serial multiplex inverter.

The present invention is targeted for controlling a serial multiplex inverter. FIG. 1 is a schematic diagram showing configuration of a main circuit of a typical serial multiplex inverter. FIG. 1 merely shows an example of a serial multiplex inverter, and the present invention may be applied to a serial multiplex inverter configured differently. In the following, with reference to FIG. 1, the serial multiplex inverter is assumed to have N cell stages.

In FIG. 1, the serial multiplex inverter includes an input power supply 1, a transformer 2, and an electric power conversion section 3. In the electric power conversion section 3, N (N≥2) cells $U_1$-$U_N$, $V_1$-$V_N$, $W_1$-$W_N$ are connected in series in each phase.

Each cell $U_1$-$U_N$, $V_1$-$V_N$, $W_1$-$W_N$ includes: a rectifier circuit 13 in which diodes are bridge-connected; a direct current link section 14 including a capacitor C; and an inverter section 15 in which switching elements are bridge-connected.

The rectifier circuit 13 side of each cell $U_1$-$U_N$, $V_1$-$V_N$, $W_1$-$W_N$ is connected to the transformer 2, and the inverter section 15 side thereof is connected in series in each phase. The cell $U_1$, $V_1$, $W_1$ of each phase is connected to each other. Furthermore, the cell $U_N$, $V_N$, $W_N$ of each phase is connected to a load (motor, LR load, etc.). As shown in FIG. 1, the phase voltage of the U-phase is represented by $V_U$, and the line-to-line voltage between the U-phase and the V-phase is represented by $V_{UV}$.

Figure 2:
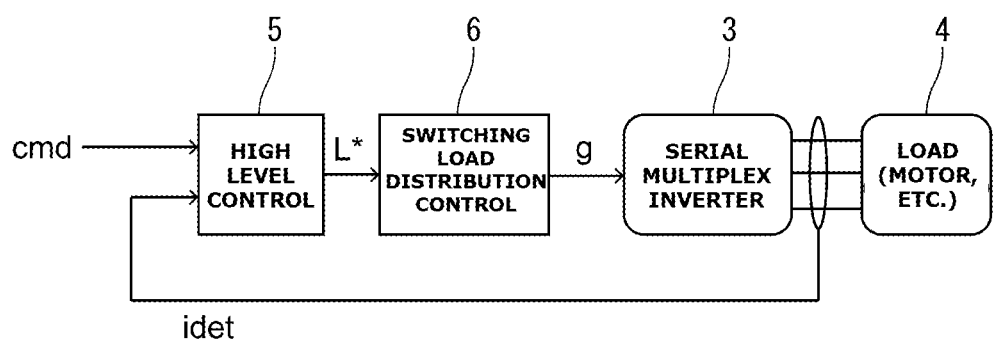
FIG. 2 is a block diagram showing a system configuration according to the present invention.

FIG. 2 shows a system configuration diagram of the present invention. FIG. 2 shows a system that operates the serial multiplex inverter (electric power conversion section 3) based on a command value given from an operation panel or the like so as to control the current and frequency in the load 4 such as a motor.

The command value cmd and a sensed electric current idet are inputted to a high level control section 5, which outputs a level command L* based on a control of FIG. 3 described below. The level command L* is inputted to a switching load distribution control section 6, which outputs a gate signal g in consideration of distribution of the switching load among the cells. Based on the gate signal g, switching of the serial multiplex inverter (electric power conversion section 3) is performed. As the command value cmd, a command value such as an electric current command or a speed command is inputted in accordance with configuration of the high level control section 5.

The present system has a typical configuration using a switching load distribution control, which is not limited to FIG. 2. For example, the sensed electric current idet may not be inputted to the high level control section 5; position information of the load (motor) 4 may be fed back to the high level control section 5; the command value may include a plurality of command values such as a d-axis current command and a speed command; and a separate control may be added as a stage subsequent to the switching load distribution control section 6 for generating a gate signal, wherein the separate control does not impair the switching load distribution effect.

Figure 3:
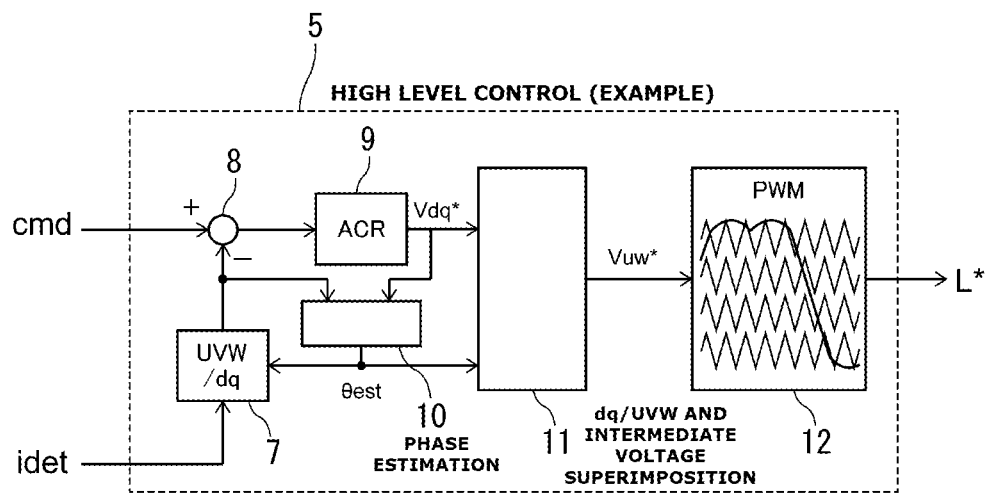
FIG. 3 is a block diagram showing a high level control section.

FIG. 3 shows an example of configuration of the high level control section 5 shown in FIG. 2. FIG. 3 shows a configuration of electric current control without a position sensor. A two-phase-to-three-phase conversion part 7 performs a UVW/dq conversion to convert the sensed electric current idet. A subtraction part 8 calculates a difference between the command value cmd and the sensed electric current idet after the UVW/dq conversion. An ACR (Auto Current Regulator) 9 performs a PI control or the like based on the difference calculated by the subtraction part 8, and outputs a dq axis voltage command Vdq*.

Then, an intermediate voltage superimposition part 11 performs a dq/UVW conversion and an intermediate voltage superimposition on the dq axis voltage command Vdq* to generate a UVW axis voltage command Vuvw*. A PWM modulation part 12 generates the level command L* based on comparison between the UVW axis voltage command Vuvw* and carrier signals, and outputs the level command L*.

A phase estimation part 10 calculates an estimated phase θest for coordinate conversion, based on the dq axis sensed electric current idet and the dq axis voltage command Vdq*. For example, the calculation of the estimated phase is implemented by a combination of angular velocity estimation based on model parameters and PLL (Phase Locked Loop).

The configuration of FIG. 3 is just an example, and the control may be configured arbitrarily as long as the level command L* is given to the switching load distribution control section 6. Namely, the high level control section 5 may be configured to perform a speed control, a position control, or an electric current control with a sensor. Furthermore, the sensorless current control may be differently configured without the intermediate voltage superimposition, or may be configured to set the level command L* by a method other than triangular wave comparison.

There is a control method that directly obtains a gate signal from triangular wave comparison PWM. However, here, it is assumed that only the level of the phase voltage is determined by triangular wave comparison. If the configuration of triangular wave comparison PWM itself cannot be changed, the gate signal may be obtained and then converted to the level command L* in consideration of circuit configuration.

The following first to eighth embodiments are described with a mechanism for determining the gate signal for one phase of the serial multiplex inverter. However, the present invention is targeted to systems not limited to a single phase. When used in actual control, the control according to each of the first to eighth embodiments is performed for all the phases in accordance with circuit configuration, to determine all the gate signals.

Furthermore, in the serial multiplex inverter, a buffer period (dead time) is provided in the gate signal in order to prevent a short circuit of the single-phase inverter of each cell. Although description thereof is omitted in the present description, the control is actually provided with the dead time appropriately provided at the subsequent stage of the switching load distribution control section 6.

Figure 4:
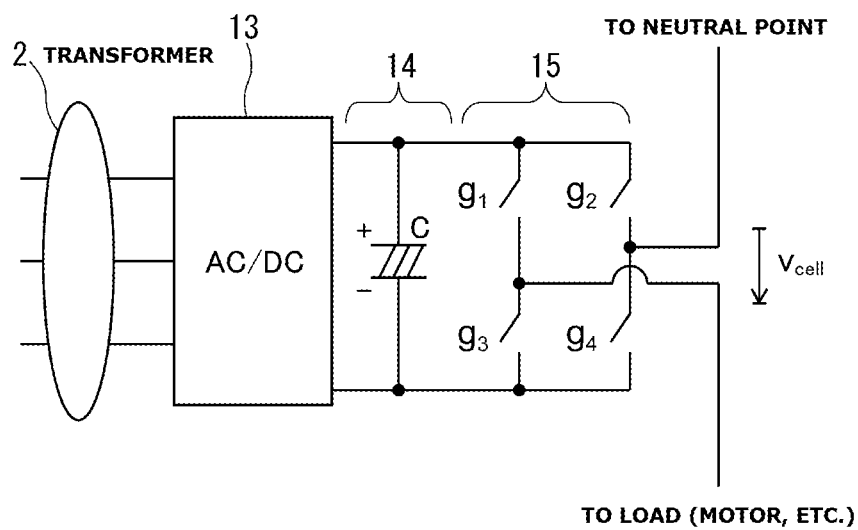
FIG. 4 is a schematic diagram showing definition of each cell.

For description of operation of the embodiment, the cell single-phase inverter is defined as follows. FIG. 4 shows the definition of the cell. The transformer 2 and the rectifier circuit 13 are mechanisms for appropriately insulating the input power supply 1 and generating a DC voltage in the serial multiplex inverter shown in FIG. 1. Since these are not directly related to the object of the present invention, the configuration thereof is described in a simplified form. Each switching element in this control may be regarded as an ideal switch. Accordingly, ideal switches g1 to g4 are assumed.

Regarding a relationship between operation of the ideal switches g1 to g4 and a cell voltage level vcell [level] can be expressed by a mathematical expression (1), in consideration of the polarity of the capacitor, a point of connection of a line leading to a neutral point, and a point of connection of a line leading to the load.

$$v_{cell} = \begin{cases} +1 & (g_1 = 1, g_2 = 0, g_3 = 0, g_4 = 1) \\ 0 & (g_1 = 1, g_2 = 0, g_3 = 1, g_4 = 0, \text{ or } g_1 = 0, g_2 = 1, g_3 = 0, g_4 = 1) \\ -1 & (g_1 = 0, g_2 = 1, g_3 = 1, g_4 = 0) \end{cases} \quad (1)$$

In the present description, a notation "giX" represents a gate signal in the i-th cell, wherein X ($1 \leq X \leq 4$, X is a natural number) designates one of the ideal switches g1 to g4 in FIG. 4. For example, g82 represents a gate signal corresponding to the ideal switch g2 in FIG. 4 in the eighth cell of the corresponding phase.

Figure 5:
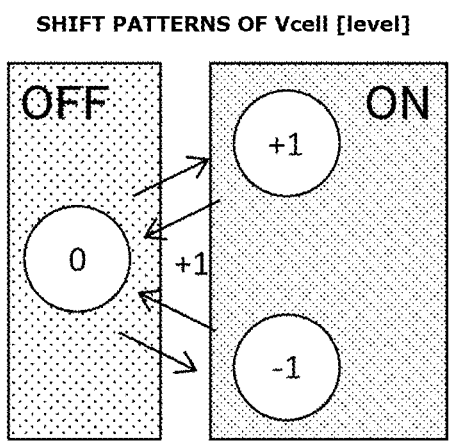
FIG. 5 is an explanatory diagram showing state shifts of a cell voltage.

Then, if there is no request for a two-step voltage shift in a cell, the cell voltage level vcell can be assumed to shift in states as shown in FIG. 5. As shown in FIG. 5, the cell voltage level vcell shifts from zero level to +1 level or −1 level. In the present description, when the cell voltage level vcell is at zero level, it is described that the cell is OFF, and when the cell voltage level is at ±1 level, it is described that the cell is ON.

The following description of the first to eighth embodiments uses expressions such as an ON-counter and an OFF-counter, wherein "ON" and "OFF" in this terminology correspond to "ON" and "OFF" in FIG. 5. The following details the control device for the serial multiplex inverter according to the first to eighth embodiments of the present invention.

<First Embodiment> The following describes a policy of the method of distributing the switching load of each cell. The switching load of each cell is unbalanced under a condition where a specific cell does not switch for a long time, or a condition where a specific cell switches frequently in a short time.

Accordingly, the switching load can be distributed by controlling so that no cell does not switch for a long time and no cell switches in a short time. For example, this means that when a cell A is designated and level-shifted for a phase voltage level shift, there must be no cell (referred to as a cell B) that continues to have the same output as the cell A for a longer period of time.

If the cell B is not designated, the switching frequency of the cell B is relatively lowered of all the cells, so that the switching frequency of the cell A is relatively raised because the cell A is selected even though the cell A has the longest output duration. Therefore, for shifting the level of the phase voltage, the cell having the longest output duration is designated and level-shifted. This makes it possible to distribute the switching load of each cell.

Figure 6:
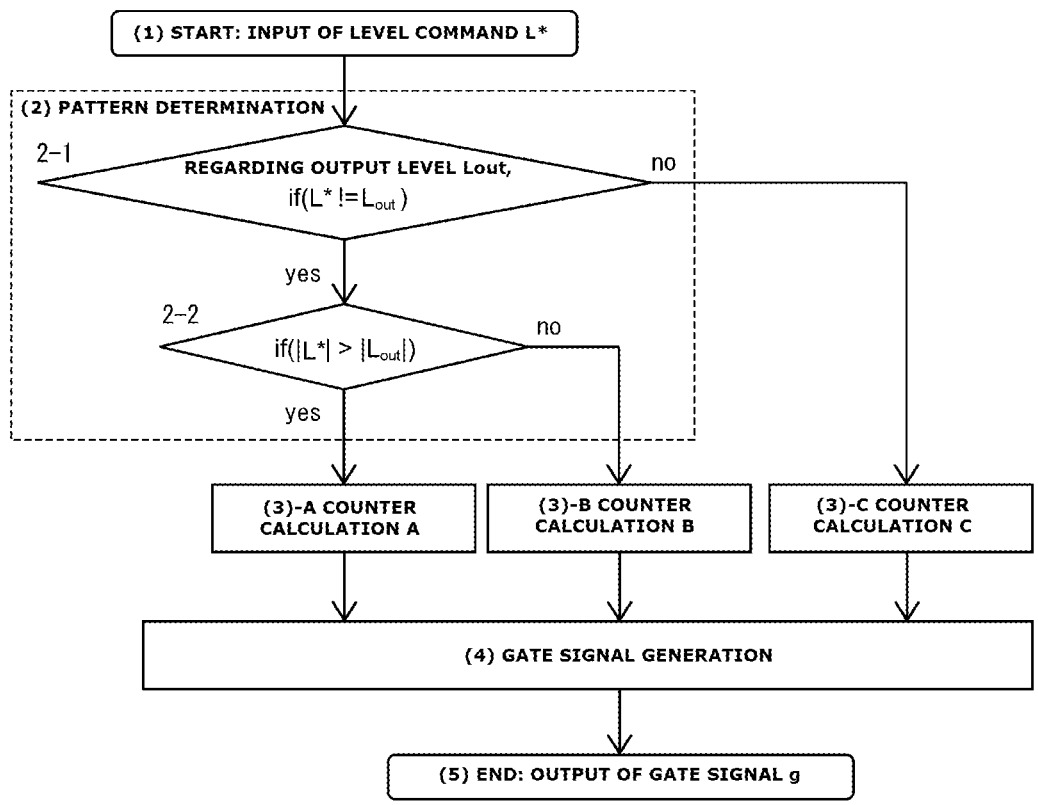
FIG. 6 is a flowchart showing a process performed by a switching load distribution control section according to first to seventh embodiments.

By carrying out the flowchart of FIG. 6 in the switching load distribution control section 6, switching can be distributed among the cells in the serial multiplex inverter. The following describes behavior of the flowchart of FIG. 6. In the flowchart of FIG. 6, the level command L* is inputted and the gate signal g is outputted. FIG. 6 shows an overall flow of the switching load distribution control section 6, wherein the configuration of FIG. 6 is common to the first to seventh embodiments. Operations (3) and (4) are configured differently in each embodiment. In the first embodiment, a counter calculation operation (3) in FIG. 6 corresponds to FIG. 7, and a gate signal generation operation (4) in FIG. 6 corresponds to FIG. 9.

(1) Input the level command L*,
(2) Perform a pattern determination operation to determine the pattern of counter operation by observing changes of the level command L* with respect to an output level Lout,
(3) Perform a counter calculation operation to equalize the output duration; Here, perform a different operation depending on the pattern determined by (2),
(4) Perform a gate signal generation operation for generating the gate signal with reference to a counter value, and
(5) Output the gate signal.

By the operations (1) to (5), the switching load of each cell can be distributed.

Next, the following describes the pattern determination operation (2). For shifting the level of the phase voltage, it is required to designate the cell to be level-shifted, in consideration of the fact that the cell can output only +1, 0, −1 levels. For example, when shifting the phase voltage from +2 level to +3 level, if a cell that is outputting +1 level is designated as the cell to be level-shifted, the output of the cell cannot be set to +2 level, and the phase voltage cannot be raised to +3 level. In this case, the cell designation is invalid. Therefore, cell designation must be done with care.

By the pattern determination operation (2), the following three types are branched in order to designate an appropriate one of the cells.

(A) A level shift with a shift of a cell from OFF to ON,
(B) A level shift with a shift of a cell from ON to OFF, and
(C) No level shift.

By branching to these three types, invalid cell designation can be prevented. At 2-1 in FIG. 6, it is determined whether or not the level command L* is equal to the output level Lout. When the level command L* is not equal to the output level Lout, the process proceeds to 2-2 in FIG. 6. When the level command L* is equal to the output level Lout, the process proceeds to (3)-C in FIG. 6. Thereby, it can be determined whether or not it satisfies (C) "no level shift". The output level Lout is a phase voltage level currently being outputted, which is updated by the gate signal generation operation (4).

At 2-2 in FIG. 6, the absolute value of the level command L* and the absolute value of the output level Lout are compared. When the absolute value of the level command L* is larger, the process proceeds to (3)-A. When the absolute value of the level command L* is smaller, the process proceeds to (3)-B. For (3)-A and (3)-B, it is sufficient to check whether the phase voltage is to be shifted away from the zero level or shifted toward the zero level, so that the branching is determined by comparing in magnitude the absolute value of the level command L* and the absolute value of the output level Lout.

Next, the following describes the counter calculation operation (3). An ON-counter and an OFF-counter are prepared as counters. Each counter is set to have N columns corresponding to the number of cell stages N, wherein column numbers correspond to the cells. The ON-counter indicates a duration when the corresponding cell is in a state of ON-output, and the OFF-counter indicates a duration when the corresponding cell is in a state of OFF-output.

A value of each counter indicates a length of output duration, wherein as the value increases, the output duration increases. The counter value is an integer of 0 or more, wherein when no output is performed, the counter value is equal to 0. For example, when the second cell is in the state of ON-output, a positive value is stored in the second column of the ON-counter, and zero is stored in the second column of the OFF-counter.

Figure 7:
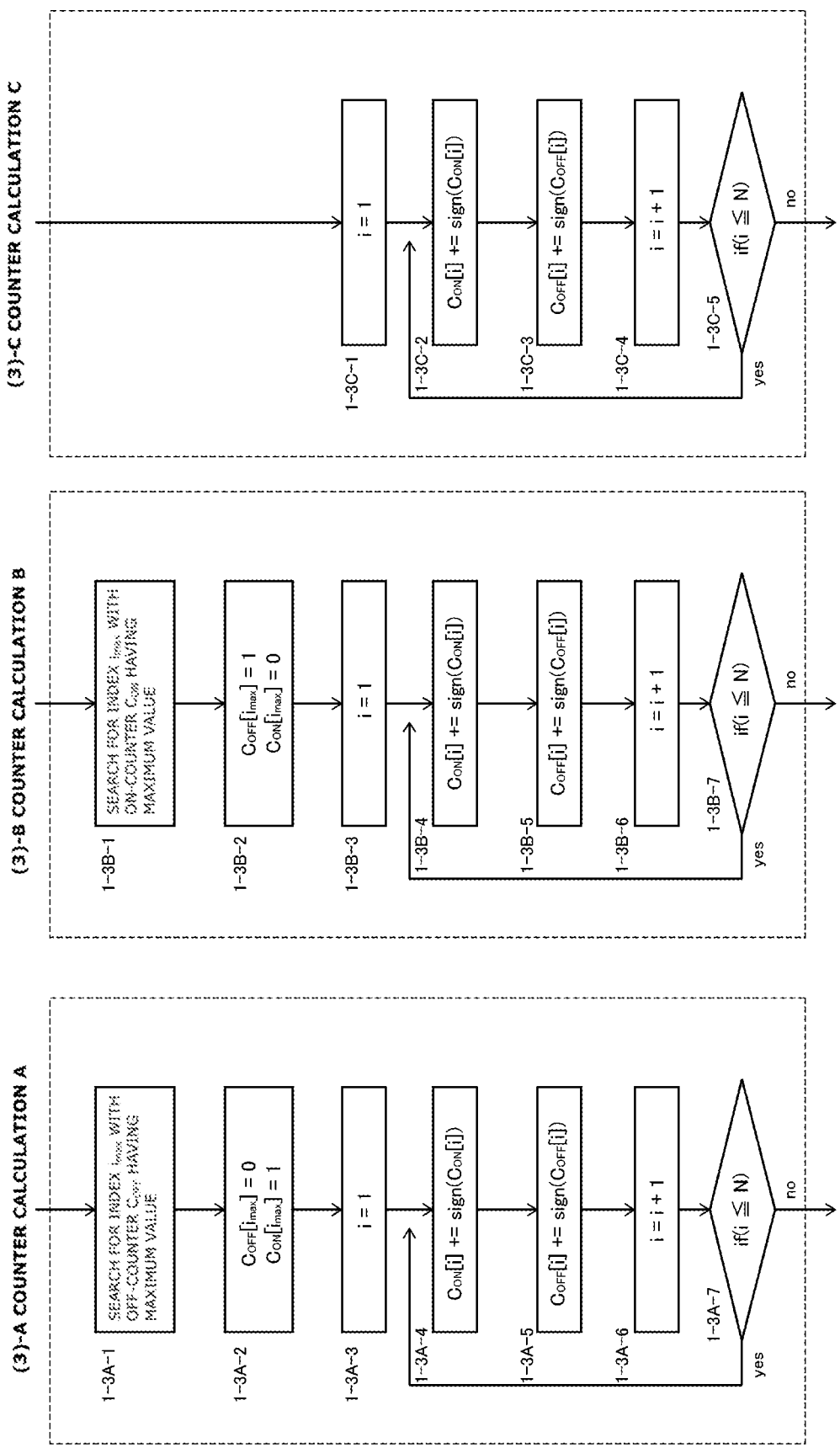
FIG. 7 is a flowchart showing a process of counter calculation according to the first embodiment.

The following discusses switching load distribution using the counters based on the rules described above. FIG. 7 shows a flowchart of the counter calculation operation (3) according to the first embodiment. This flowchart corresponds to the part (3) in FIG. 6, and there are three types of flowcharts A, B, and C depending on the result of branching by the pattern determination operation (2). In this flowchart, counter processing and counter incrementing are performed in accordance with a selected level shift pattern. The counter operation is performed in cases of A, B, and C as follows.

<Case (3)-A (OFF→ON)> At 1-3A-1, the maximum one is selected from the OFF-counters $C_{OFF}$. This operation selects the cell with the longest OFF-output duration.

At 1-3A-2, the OFF-counter of the selected cell is set equal to zero. Also, the ON-counter of the selected cell in the column corresponding to the selected OFF-counter is set to 1. This operation shifts the level of the selected cell. Furthermore, by setting the ON-counter $C_{ON}$ of the cell to 1, the output duration of this cell is always the shortest of the cells in the state of ON-output.

At 1-3A-3 to 1-3A-7, the value of each counter being positive is incremented. The counter whose counter value is equal to zero is maintained unchanged. This is an operation to increase the counter value of each cell indicating the output duration. For 1-3A-4 and 1-3A-5, a sign function is introduced to indicate that when it is positive, it is incremented, and when it is equal to zero, it is unchanged. The sign function "sign" is defined by a mathematical expression (2). In the present description, each "sign ( )" refers to the sign function defined by the mathematical expression (2).

$$\text{sign}(x) = \begin{cases} +1 & (x > 0) \\ 0 & (x = 0) \\ -1 & (x < 0) \end{cases} \quad (2)$$

Specifically, at 1-3A-3, an index i is set to 1. At 1-3A-4, when the ON-counter $C_{ON}[i]$ of the index i is positive, the ON-counter $C_{ON}[i]$ is incremented, and when the ON-counter $C_{ON}[i]$ is equal to zero, the ON-counter $C_{ON}[i]$ is unchanged. At 1-3A-5, when the OFF-counter $C_{OFF}[i]$ of the index i is positive, the OFF-counter $C_{OFF}[i]$ is incremented, and when the OFF-counter $C_{OFF}[i]$ is equal to zero, the OFF-counter $C_{OFF}[i]$ is unchanged. At 1-3A-6, the index i is set to i+1. At 1-3A-7, it is determined whether or not the index i is less than or equal to N. When the index i is less than or equal to N, the process returns to 1-3A-4, and when the index i is larger than N, the operation (3)-A is terminated.

<Case (3)-B (ON→OFF)> At 1-3B-1, the maximum one is selected from the ON-counters $C_{ON}$. This operation selects the cell with the longest ON-output duration.

At 1-3B-2, the ON-counter $C_{ON}$ of the selected cell is set to zero. Also, the OFF-counter $C_{OFF}$ of the selected cell in the column corresponding to the selected ON-counter is set to 1. This operation shifts the level of the selected cell. Furthermore, by setting the OFF-counter $C_{OFF}$ of the cell to 1, the output duration of this cell is always the shortest of the cells in the state of OFF-output.

At 1-3B-3 to 1-3B-7, the value of each counter being positive is incremented as in the case (3)-A. The counter whose counter value is equal to zero is maintained unchanged. This is an operation to increase the counter value of each cell indicating the output duration.

<Case (3)-C (no level shift)> At 1-3C-1 to 1-3C-5, each counter whose value is positive is incremented. Each counter whose value is equal to zero is maintained unchanged. This is an operation to increase the counter value of each cell indicating the output duration.

Figure 8:
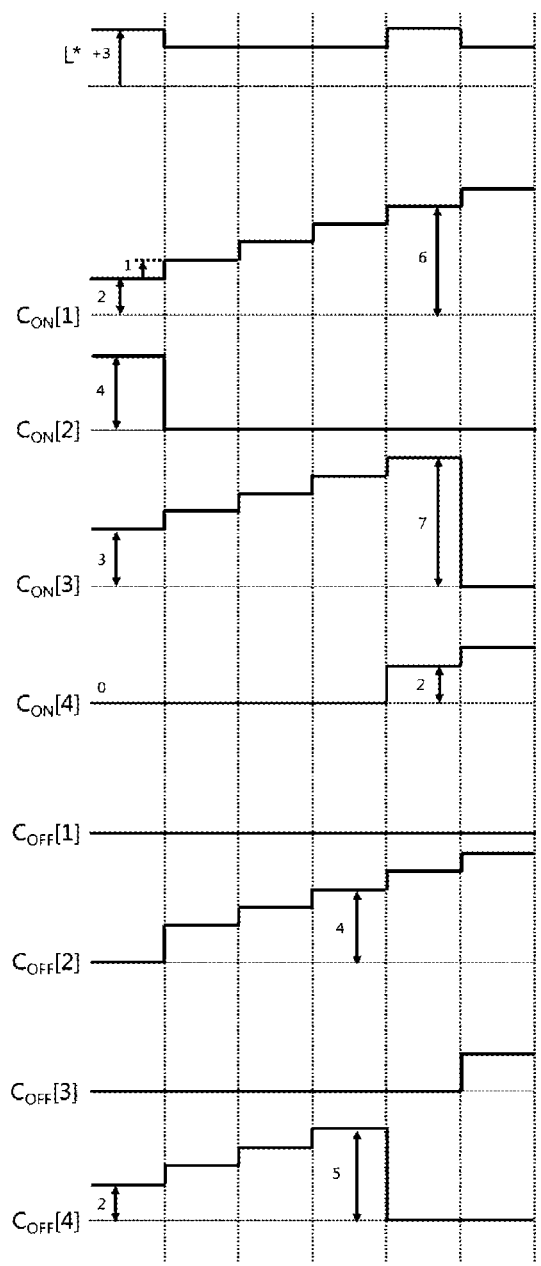
FIG. 8 is a diagram showing an example of behavior of the process of counter calculation according to the first embodiment.

FIG. 8 shows an example of behavior of the counter calculation operation (3) according to the first embodiment, wherein four cell stages are assumed. As described above, when the level shifts, the level shift is expressed by assigning to the counters. In any case of A, B, and C, each counter is incremented to express the output duration.

The first shift of the level command L* is a shift of ON→OFF, which is implemented by the operation (3)-B. The cell 2 having the maximum ON-counter $C_{ON}$ is selected, so that the ON-counter $C_{ON}[2]$ of the cell 2 is set to zero, and the OFF-counter $C_{OFF}[2]$ is set to 2.

Then, the second shift of the level command L* is a shift of OFF→ON, which is implemented by the operation (3)-A. The cell 4 having the maximum OFF-counter $C_{OFF}$ is selected, the OFF-counter $C_{OFF}[4]$ of the cell 4 is set to zero, and the ON-counter $C_{ON}[4]$ is set to 2.

The third shift of the level command L* is a shift of ON→OFF, which is implemented by the operation (3)-B. The cell 3 having the maximum ON-counter $C_{ON}$ is selected, so that the ON-counter $C_{ON}[3]$ of the cell 3 is set to zero, and the OFF-counter $C_{OFF}[3]$ is set to 2. In the first embodiment, incrementing is performed immediately after the assignment, so that the counter starts be counted from 2 after the level shifts. It is to be noted that a relationship constantly holds where as the counter value increases, the cell output duration increases.

Figure 9:
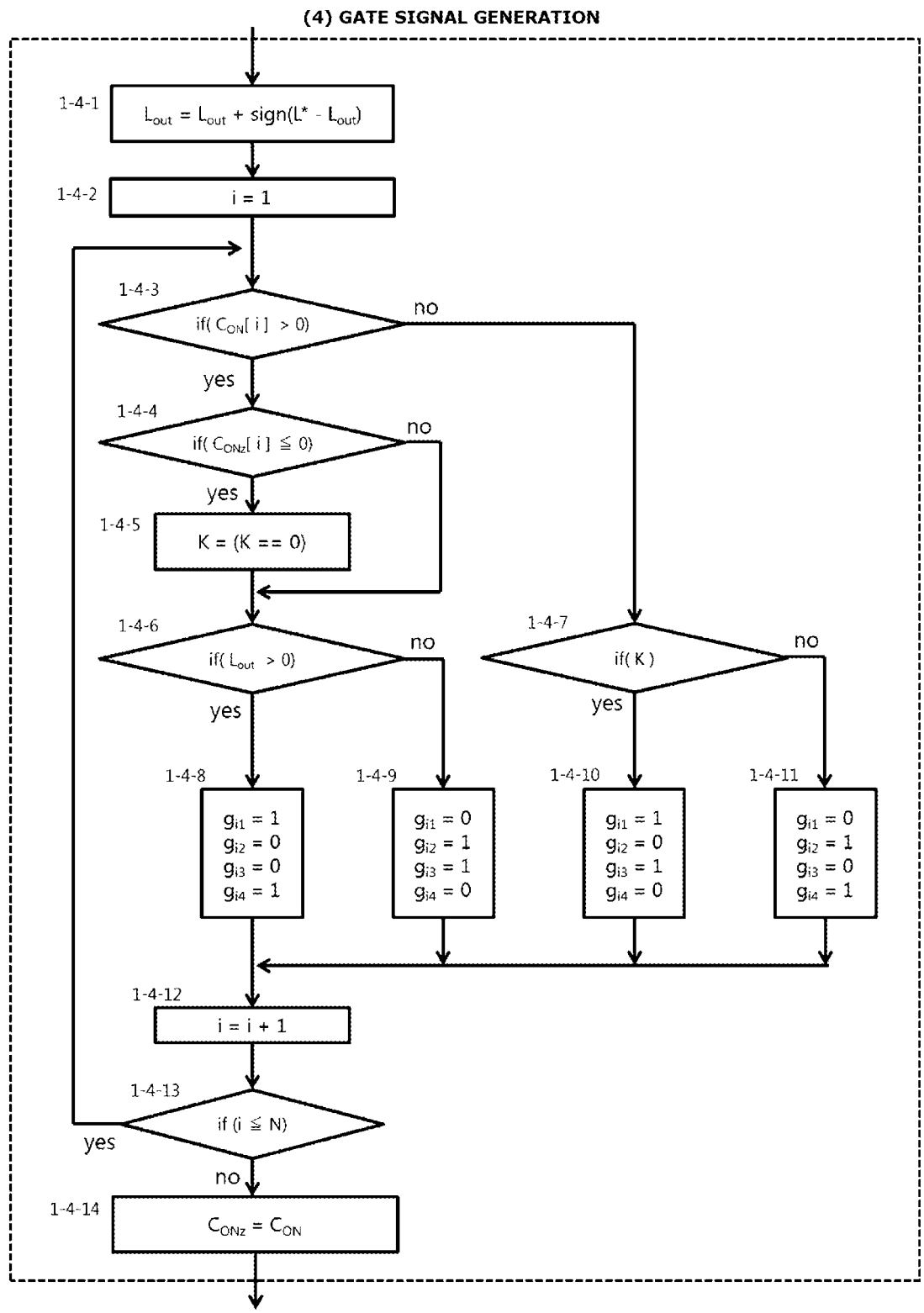
FIG. 9 is a flowchart showing a process of gate signal generation according to the first to fourth embodiments.

Next, the following describes the gate signal generation operation (4). FIG. 9 shows a flowchart of the gate signal generation operation according to the first embodiment. This flowchart corresponds to (4) in FIG. 6. N is the number of cell stages, Loutz is a previous output level, $C_{ON}z$ is a previous ON-counter value, K is a logical value that determines a 0 level mode, and giX is the switching element X in the single-phase inverter of the i-th stage cell (1≤i≤N, 1≤X≤4, i and X are natural numbers).

First, the output level Lout is updated based on the level command L*. The update is ruled as follows. When the level shifts, one counter is changed by (3), so that the output level Lout is brought closer to the level command L* by one step. When there is no level shift, the output level Lout is not changed. At 1-4-1, the update is expressed by adding the output of the sign function of the difference between the level command L* and the output level Lout to the output level Lout.

Next, the level of each cell is determined in the following manner. When the ON-counter $C_{ON}$ of a cell has a positive value, the cell is turned ON (1-4-3). Thereby, the cell is set to ±1 level, and the positive/negative sign of the level is set to be the same as that of the output level Lout (1-4-6). When the ON-counter $C_{ON}$ of a cell is equal to zero, the cell is turned OFF (1-4-3). Thereby, the cell is set to zero level. This designates the voltage level of each cell in accordance with the counter value.

Specifically, at 1-4-2, the index i is set to 1. At 1-4-3, it is determined whether or not the ON-counter $C_{ON}$ is larger than zero. When the ON-counter $C_{ON}$ is larger than zero, the process proceeds to 1-4-4. When the ON-counter $C_{ON}$ is not larger than zero, the process proceeds to 1-4-7.

At 1-4-4, it is determined whether or not an ON-counter previous value $C_{ONZ}$ is less than or equal to zero. When the ON-counter previous value $C_{ONZ}$ is less than or equal to zero, the process proceeds to 1-4-5. When the ON-counter previous value $C_{ONZ}$ is greater than zero, the process proceeds to 1-4-6. At 1-4-5, the logical value K is switched.

At 1-4-6, it is determined whether or not the output level Lout is larger than zero. When the output level Lout is larger than zero, the process proceeds to 1-4-8. When the output level Lout is less than or equal to zero, the process proceeds to 1-4-9.

At 1-4-7, when the logical value K is equal to 1, the process proceeds to 1-4-10, and when the logical value K is equal to zero, the process proceeds to 1-4-11.

The gate signal of each cell is determined as follows. For explanation, the cell of interest is referred to as a cell i. Reference is made to FIG. 4 for the relationship between the gate signal number and its position in the circuit.

When the cell i is to output+1 level, it is set at 1-4-8 so that gi1=1, gi2=0, gi3=0, gi4=1. When the cell i outputs the −1 level, it is set at 1-4-9 that gi1=0, gi2=1, gi3=1, gi4=0.

When the cell i is to output the zero level, it branches at 1-4-7 in accordance with the logical value K that determines the mode of zero level. In case of K=1, it is set at 1-4-10 that gi1=1, gi2=0, gi3=1, gi4=0. In case of K=0, it is set at 1-4-11 that g1=0, gi2=1, gi3=0, gi4=1.

By this operation, the gate signal is set in accordance with the designated voltage level of the cell. In the case of zero level, the branch is implemented by using the logical value K, which is a control for distributing the load among the elements in the cell. If driving is performed by only one of the two types of gate signal designation modes of zero level, only a specific element bears an impact at the time of reflux, which accelerates deterioration of the element.

In order to avoid this, the mode switching is performed every time the zero level occurs.

In the present description, the logical value K is switched at a timing when the cell switches from OFF to ON (1-4-4, 1-4-5). This switching may be performed at another timing. For example, the switching of the logical value K may be performed at a timing of switching from ON to OFF, or may be performed every cycle of a fundamental wave. However, if the logical value K is switched while the cell i continues to output the zero level, all the elements are switched simultaneously, which leads to a voltage error and/or an increase in switching frequency. Therefore, the switching of the logical value K is performed so as to avoid this phenomenon.

In the foregoing, the cell i is picked up for explanation. However, it is necessary to perform these operations on all the cells. At 1-4-12, i is set as i=i+1. At 1-4-13, when i is less than or equal to N, the process returns to 1-4-3, and when i is larger than N, the process proceeds to 1-4-14. At the end of (4) (at 1-4-14), in order to employ the ON-counter previous value $C_{ON}z$ for switching the logical value K, the current counter value $C_{ON}$ is substituted into the ON-counter previous value $C_{ON}z$.

By the calculation (4) described above, the gate signal can be outputted in accordance with the counter controlled to distribute the switching load.

The foregoing describes FIG. 6 and the details of operation of (3) and (4) in FIG. 6. In view of the foregoing explanation, it can be understood that the gate signal g with which the switching load of each cell is distributed can be outputted in accordance with the level command L* set at (1) by the configuration of FIG. 6.

Therefore, by using the switching load distribution control of FIG. 6 in the system of FIG. 2, it is possible to drive the serial multiplex inverter while distributing the switching load of each cell.

The important point of the first embodiment is that the output duration of each cell is expressed by performing the operation to increase the counter, and the counter is reset in accordance with the pattern of level shift of the phase voltage. The specific calculation method is not limited to the method shown in FIGS. 7 and 9.

As described above, according to the first embodiment, it is possible to optimally distribute the switching load among the cells by the control to preferentially shift the level of the cell having the maximum output duration, by using the counters that record the output durations.

By employing the separate controls for designation of the voltage level and for generation of the gate signals with which the switching load is distributed, the switching load of each cell can be distributed regardless of the method for generating the voltage level.

Furthermore, in contrast to patent documents 1 to 3, there are advantages that no table is required, a higher level of distribution is possible than triangular wave comparison based on the PS method, and it is unnecessary to determine cell voltages in advance to switching load distribution control.

<Second Embodiment> In the second embodiment, the switching load is distributed among the cells according to FIG. 6 as in the first embodiment. However, the counter calculation operation (3) is implemented differently from that of the first embodiment.

In the first embodiment, each counter has a value of an integer greater than or equal to zero, but in the second embodiment, each counter has a value controlled to be also negative. This serves to reduce the number of counters and reduce the number of required registers.

The following describes the counter calculation operation (3) according to the second embodiment. The absolute value of each counter indicates the length of the output duration. When each counter has a positive value, it indicates an ON-output, and when the counter has a negative value, it indicates an OFF-output.

Figure 10:
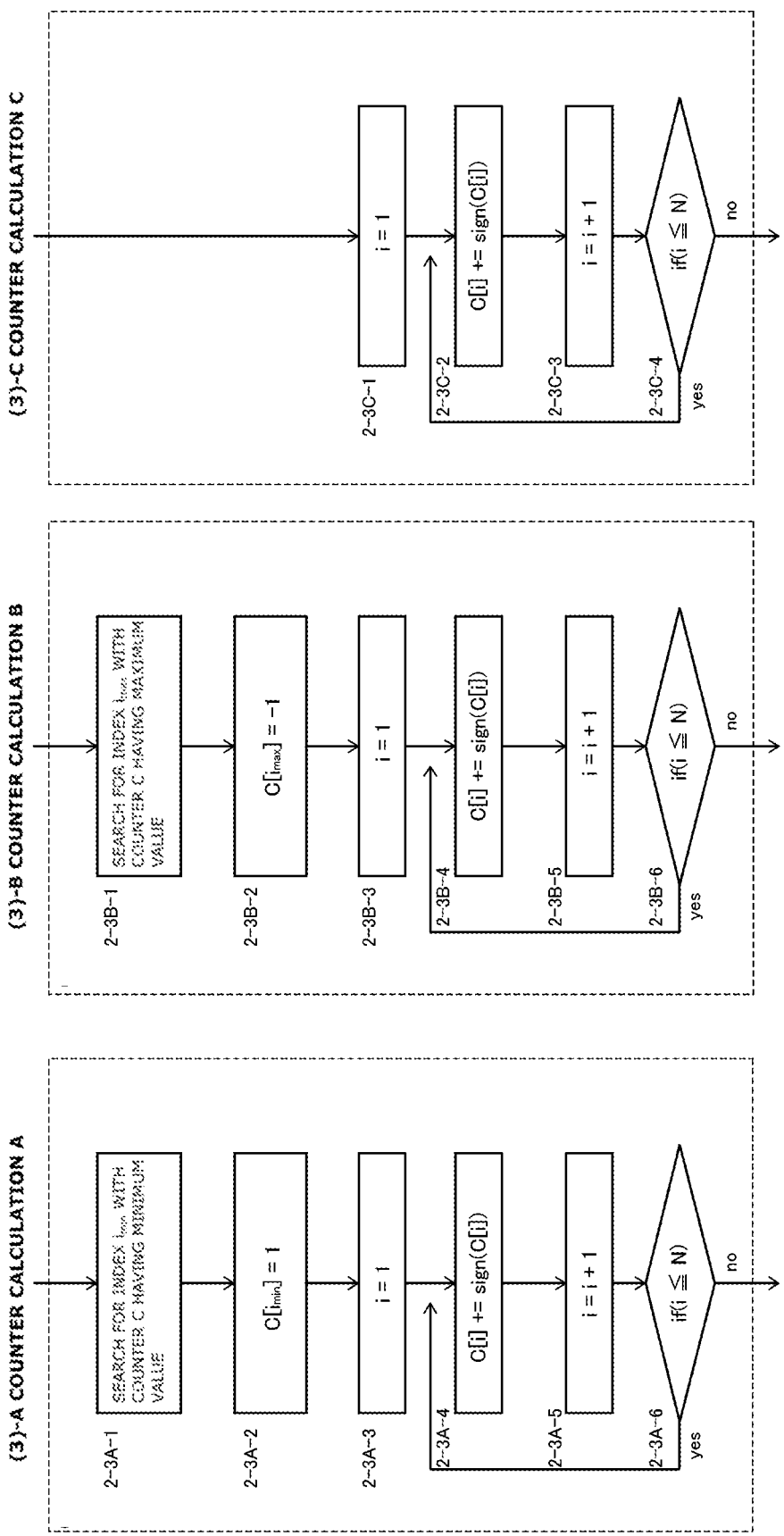
FIG. 10 is a flowchart showing a process of counter calculation according to the second embodiment.

FIG. 10 shows a flowchart of the counter calculation operation according to the second embodiment. Similar to FIG. 7, this flowchart corresponds to (3) in FIG. 6, wherein there are three types of flowcharts selected depending on the result of the branching at (2). The counter operation is performed for cases of A, B, and C as follows.

<Case (3)-A (OFF→ON)> At 2-3A-1, a cell is selected whose counter has a negative value whose absolute value is the largest, namely, a cell is selected which has the minimum counter value. This operation selects the cell with the longest OFF-output duration. At 2-3A-2, the counter value of the selected cell is set to 1.

At 2-3A-3, the index i is set to 1. At 2-3A-4, the counter value is incremented when the counter value is positive. The counter value is decremented when the counter value is negative. This is an operation to increase the absolute value of the counter value of each cell indicating the output duration. Incrementing and decrementing are expressed by summing the counter value and the result of inputting the counter value to the sign function. 2-3A-5 and 2-3A-6 are the same as 1-3A-6 and 1-3A-7.

<Case (3)-B (ON→OFF)> At 2-3B-1, a cell is selected whose counter has a positive value whose absolute value is the largest, namely, a cell is selected which has the maximum counter value. This operation selects the cell with the longest ON-output duration. At 2-3B-2, the counter value of the selected cell is set to −1.

At 2-3B-3 to 2-3B-6, the counter value is incremented when the counter value is positive, and the counter value is decremented when the counter value is negative. This is an operation of increasing the absolute value of the counter value of each cell indicating the output duration.

<Case (3)-C (no level shift)> At 2-3C-1 to -3C-4, the counter value is incremented when the counter value is positive, and the counter value is decremented when the counter value is negative. This is an operation of increasing the absolute value of the counter value of each cell indicating the output duration.

Figure 11:
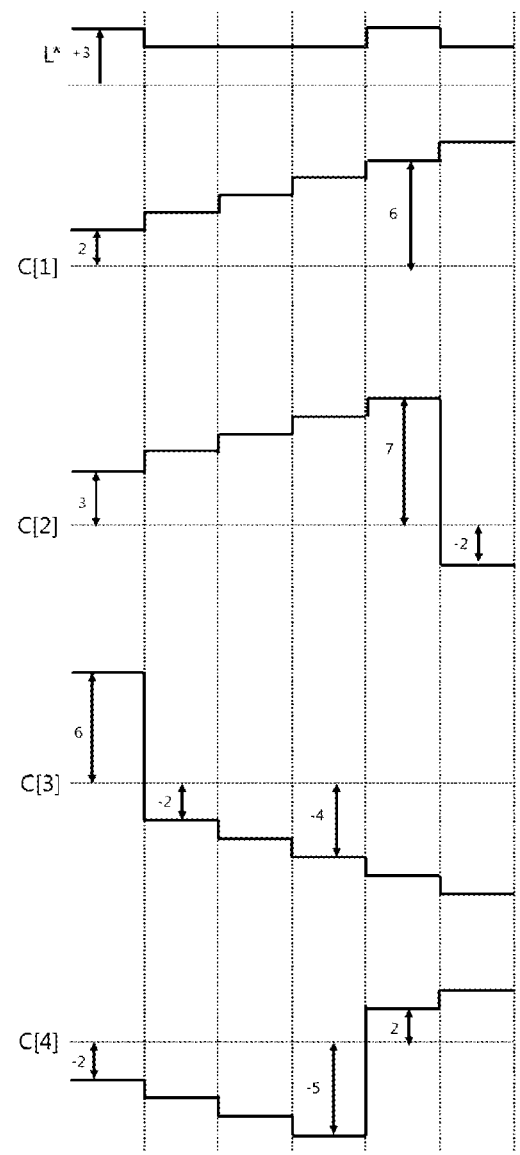
FIG. 11 is a diagram showing an example of behavior of the process of counter calculation according to the second embodiment.

FIG. 11 shows an example of behavior of the counter calculation operation (3) according to the second embodiment. Similar to the case of FIG. 8, at three timings of level shifting, the operations (3)-B, (3)-A, and (3)-B are performed, wherein the cells as targets of assignment are the cell 3, cell 4, and cell 2, respectively.

The first shift of the level command L* indicates a command of ON→OFF, upon which the operation (3)-B is performed. The cell 3 with the counter C having the maximum value of 6 is selected, and the counter C[3] is set to −2. The counters of the other cells are incremented or decremented in accordance with the sign of the counter value.

The second shift of the level command L* indicates a command of OFF→ON, upon which the operation (3)-A is performed. The cell 4 with the counter C having the minimum value of −5 is selected, and the counter C[4] is set to 2. The counters of the other cells are incremented or decremented in accordance with the sign of the counter value.

The last shift of the level command L* indicates a command of ON→OFF, upon which the operation (3)-B is performed. The cell 2 with the counter C having the maximum value of 7 is selected, and the counter C[2] is set to −2. The counters of the other cells are incremented or decremented in accordance with the sign of the counter value.

While reducing the number of counters to half that of the first embodiment, the relative relationship among the ON-output durations and the relative relationship among the OFF-output durations are maintained.

In the second embodiment, only the counter calculation operation (3) is modified, and (4) is implemented by the configuration of FIG. 9. However, since the ON-counter $C_{ON}$ does not exist, the ON-counter $C_{ON}$ is read as the counter C. Furthermore, the ON-counter previous value $C_{ON}z$ is read as Cz.

It is 1-4-3 and 1-4-4 that the reading is relevant. Regarding 1-4-3, the reading causes no problem, because in the first embodiment, when the ON-counter $C_{ON}$ is positive, the cell is ON, and in the second embodiment, when the counter C is positive, the cell is ON. Namely, when the counter C is positive, a gate signal is generated to turn on the cell, and when the counter C is negative, a gate signal is generate to turn off the cell.

Also, regarding 1-4-4, the reading causes no change in the meaning of branching and causes no problem, because when the ON-counter previous value $C_{ON}z$ is equal to zero it means an OFF state in the first embodiment and when the counter previous value Cz is negative it means an OFF state in the second embodiment.

With the modifications described above, it is possible to realize a control of the serial multiplex inverter in which the switching load is distributed, with a smaller number of registers than in the first embodiment. As in the first embodiment, the detailed calculation method of the second embodiment is not limited to FIGS. 10 and 9.

As described above, according to the second embodiment, it is possible to optimally distribute the switching load among the cells by the control to preferentially shift the level of the cell having the maximum output duration, by using the counters that record the output durations by positive and negative values. Furthermore, it can be implemented by a smaller number of registers than in the first embodiment and third and fifth embodiments described below.

Furthermore, in contrast to patent documents 1 to 3, there are advantages that no table is required, a higher level of distribution is possible than triangular wave comparison based on the PS method, and it is unnecessary to determine cell voltages in advance to switching load distribution control.

<Third Embodiment> In the first and second embodiments, the cell output duration is expressed by incrementing (or decrementing) in each branch.

For example, a pattern X and a pattern Y are considered, wherein the pattern X is a pattern that the phase voltage shifts from +1 level to +2 level at t1 [s], and wherein the pattern Y is a pattern that the same level shift (+1→+2) is composed of no level shift during a period from t1 [s] to t1+0.1 [s] and a level shift from +1 level to +2 level at t1+0.1 [s].

In the configurations of the first and second embodiments, the increment (or decrement) is constantly performed, so that the counter value immediately before assignment operation to the counter is larger in the case of the pattern Y than that in the case of the pattern X.

However, for cell designation, the relative relationship among the counter values is not different between the pattern X and the pattern Y, and the pattern X and the pattern Y have the same shift of +1→+2, so that the same cell is to shift in level in both the pattern X and the pattern Y. In view of this, it can be seen that cell designation for distributing the switching load in the pattern Y can be achieved without incrementing any counter value at t1 [s].

Namely, the key point of switching load distribution control is a relative relationship of whether the cell has a longer or shorter output duration than the other cells, wherein the absolute value of the counter value (or time) itself does not matter.

In view of the foregoing, in the third embodiment, a control is performed so that the output duration of each cell is handled only in terms of relative relationship. In the first and second embodiments, the counters are constantly incremented, which requires to manage whether or not the counters overflow. However, this does not need to be considered in the third embodiment.

Modifications from the first embodiment to the third embodiment are only in the counter calculation operation (3). The following describes the counter calculation operation (3) according to the third embodiment.

There are two types of counters, an ON-counter and an OFF-counter. As the counter value increases, the output duration increases with respect to the other cells. In order to express only the relative relationship in output duration, the counters are incremented only when the level shifts, and are not incremented when there is no level shift.

Figure 12:
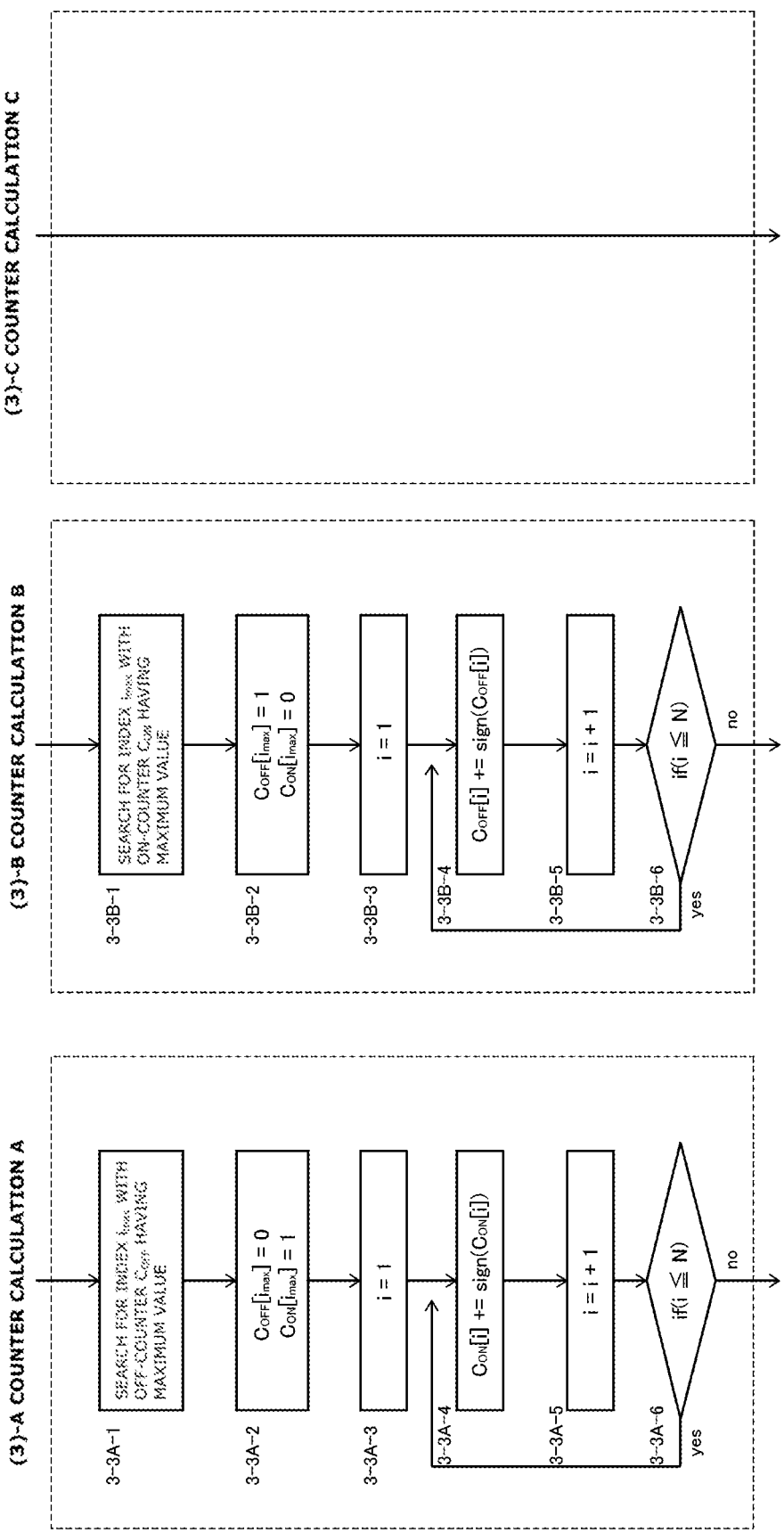
FIG. 12 is a flowchart showing a process of counter calculation according to the third embodiment.

FIG. 12 shows a flowchart of the counter calculation operation according to the third embodiment. Similar to FIG. 7, this flowchart corresponds to (3) in FIG. 6, wherein there are three types of flowcharts selected depending on the result of the branching at (2). The counter operation is performed for cases of A, B, and C as follows.

<Case (3)-A (OFF→ON)> At 3-3A-1, the maximum one is selected from the OFF-counters $C_{OFF}$. This operation selects the cell with the longest OFF-output duration.

At 3-3A-2, the OFF-counter $C_{OFF}$ of the selected cell is set equal to zero. Also, the ON-counter $C_{ON}$ of the selected cell in the column corresponding to the selected OFF-counter $C_{OFF}$ is set to 1. This operation shifts the level of the selected cell. Furthermore, by setting the ON-counter $C_{ON}$ of the cell to 1, the output duration of this cell is always the shortest of the cells in the state of ON-output.

At 3-3A-3 to 3-3A-6, the value of each ON-counter counter $C_{ON}$ being positive is incremented. Each ON-counter whose counter value is equal to zero is maintained unchanged. This is an operation to increase the absolute value of the counter value of each cell indicating the output duration. In contrast to the first embodiment, in the third embodiment, only the ON-counters $C_{ON}$ are incremented, whereas the OFF-counters $C_{OFF}$ are maintained unchanged.

<Case (3)-B (ON→OFF)> At 3-3B-1, the maximum one is selected from the ON-counters $C_{ON}$. This operation selects the cell with the longest ON-output duration.

At 3-3B-2, the ON-counter $C_{ON}$ of the selected cell is set to zero. Also, the OFF-counter $C_{OFF}$ of the selected cell in the column corresponding to the selected ON-counter $C_{ON}$ is set to 1. This operation shifts the level of the selected cell. Furthermore, by setting the OFF-counter $C_{OFF}$ of the cell to 1, the output duration of this cell is always the shortest of the cells in the state of OFF-output.

At 3-3B-3 to 3-3B-6, the value of each OFF-counter $C_{OFF}$ being positive is incremented. Each OFF-counter whose counter value is equal to zero is maintained unchanged. This is an operation to increase the absolute value of the counter value of each cell indicating the output duration. In contrast to the first embodiment, in the third embodiment, only the OFF-counters $C_{OFF}$ are incremented, whereas the ON-counters $C_{ON}$ are maintained unchanged.

<Case (3)-C (no level shift)> In the third embodiment, at (3)-C, no operation is performed. This serves to prevent the counter values from being unnecessarily incremented.

Figure 13:
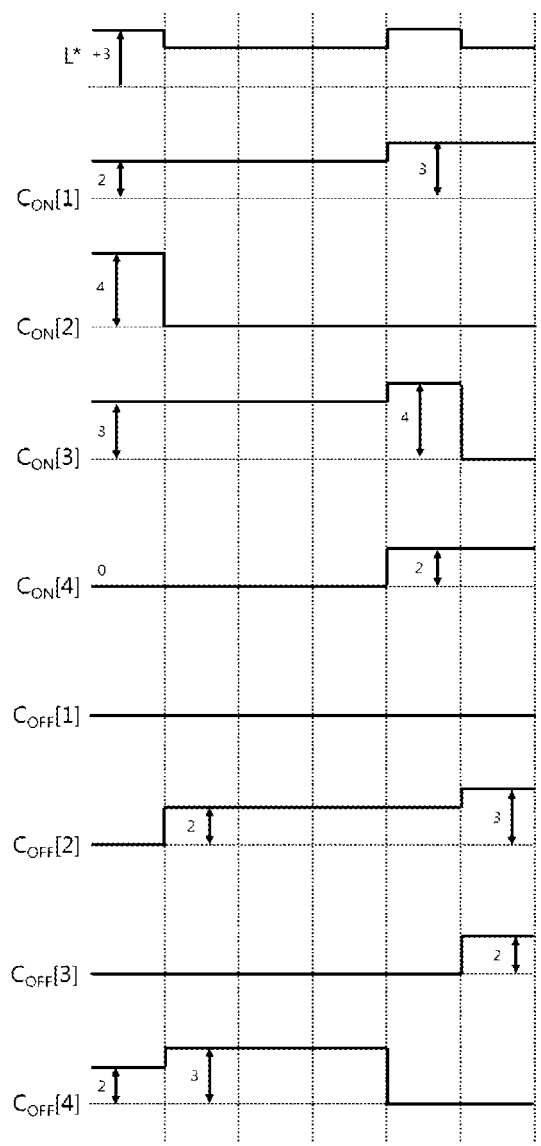
FIG. 13 is a diagram showing an example of behavior of the process of counter calculation according to the third embodiment.

FIG. 13 shows an example of behavior of the counter calculation operation (3) according to the third embodiment. Whereas the maximum counter value is 7 in FIG. 8 (the first embodiment), the maximum counter value is 4 in FIG. 13 wherein the relative relationship among ON-output durations and OFF-output durations can be maintained without unnecessary increase of the counters. Similar to the case of FIG. 8, the processes of (3)-B, (3)-A, and (3)-B are performed at three timings of level shifting, wherein assignment is made to the cell 3, cell 4, and cell 3, respectively.

The first shift of the level command L* is a shift of ON→OFF, which is implemented by the operation (3)-B. The cell 2 whose counter $C_{ON}[2]$ has the maximum value of 4 is selected, so that the counter $C_{ON}[2]$ is set to zero, and the counter $C_{OFF}[2]$ is set to 2. Furthermore, of the OFF-counters $C_{OFF}$, the counter $C_{OFF}[4]$ being positive is incremented.

The second shift of the level command L* indicates a command of OFF→ON, upon which the operation (3)-A is performed. The cell 4 whose counter $C_{OFF}$ has the maximum value of 3 is selected, so that the counter $C_{OFF}[4]$ is set to zero, and the counter $C_{ON}[4]$ is set to 2. Furthermore, of the ON-counters $C_{ON}$, the counters $C_{ON}[1]$ and $C_{ON}[3]$ being positive is incremented.

The last shift of the level command L* indicates a command of ON→OFF, upon which the operation (3)-B is performed. The cell 3 whose counter $C_{ON}[3]$ has the maximum value of 4 is selected, so that the counter $C_{ON}[3]$ is set to zero, and the counter $C_{OFF}[3]$ is set to 2. Furthermore, of the OFF-counters $C_{OFF}$, the counter $C_{OFF}[2]$ being positive is incremented.

Since incrementing is also performed when the level shifts, the counter value immediately after the level shift starts from 2.

In the third embodiment, only the counter calculation operation (3) is modified, and (4) is implemented by the configuration of FIG. 9. With the modifications described above, the switching load distribution control can be realized without the necessity of consideration of overflowing. As in the first embodiment, the detailed calculation method is not limited to FIGS. 12 and 9.

As described above, according to the third embodiment, the switching load of each cell can be optimally distributed by the control to preferentially shift the level of the cell having the maximum output duration by using the counters that record the output durations in relative relationship. It also makes it possible to prevent overflowing due to constant increment of counters.

Furthermore, in contrast to patent documents 1 to 3, there are advantages that no table is required, a higher level of distribution is possible than triangular wave comparison based on the PS method, and it is unnecessary to determine cell voltages in advance to switching load distribution control.

<Fourth Embodiment> The third embodiment employs the ON-counter and the OFF-counter. The number of counters can be halved by using negative counter values as in the second embodiment.

Figure 14:
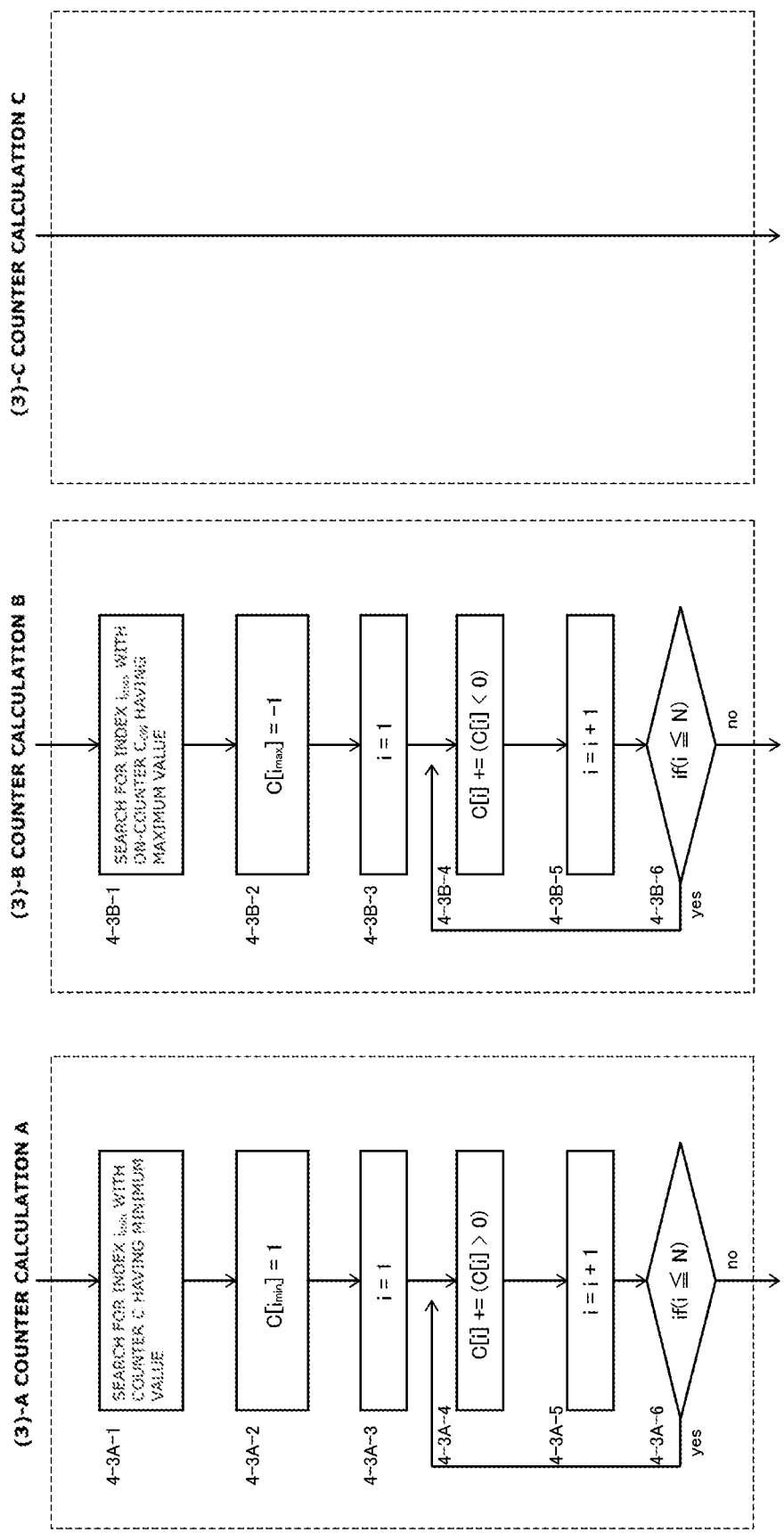
FIG. 14 is a flowchart showing a process of counter calculation according to the fourth embodiment.

Similar to the second embodiment, each counter is regarded as indicative of an ON-state when it is positive, and indicative of an OFF-state when it is negative. Furthermore, similar to the third embodiment, unnecessary increment of the counter values is avoided. FIG. 14 shows a flowchart of the counter calculation operation according to the fourth embodiment. Similar to FIG. 7, this flowchart corresponds to (3) in FIG. 6, and there are three types of flowcharts selected depending on the result of the branching at (2). The counter calculation operation is performed in cases of A, B, and C in as follows.

<Case (3)-A (OFF→ON)> At 4-3A-1, a cell is selected whose counter has a negative value whose absolute value is the largest, namely, a cell is selected which has the minimum counter value. This operation selects the cell with the longest OFF-output duration.

At 4-3A-2, the counter value of the selected cell is set to 1.

At 4-3A-3 to 4-3A-6, the counter value is incremented when the counter value is positive. When the counter value is less than or equal to zero, the counter value is maintained unchanged. This is an operation to increment the absolute value of the counter value of each cell indicating the output duration.

Incrementing is expressed by adding a result of comparison of whether or not the counter value is positive. The counter value is not a logical value, but the result of comparison is generally outputted as a logical value, and is appropriately converted to an integer value or the like and added, wherein description of the conversion is omitted.

<Case (3)-B (ON→OFF)> At 4-3B-1, a cell is selected whose counter has a positive value whose absolute value is the largest, namely, a cell is selected which has the maximum counter value. This operation selects the cell with the longest ON-output duration.

At 4-3B-2, the counter value of the selected cell is set to −1.

At 4-3B-3 to 4-3B-6, the counter value is maintained unchanged when the counter value is positive, and the counter value is decremented when the counter value is negative. This is an operation of increasing the absolute value of the counter value of each cell indicating the output duration.

<Case (3)-C (no level shift)> In the fourth embodiment, at (3)-C, no operation is performed. This serves to prevent the counter values from being unnecessarily incremented.

Figure 15:
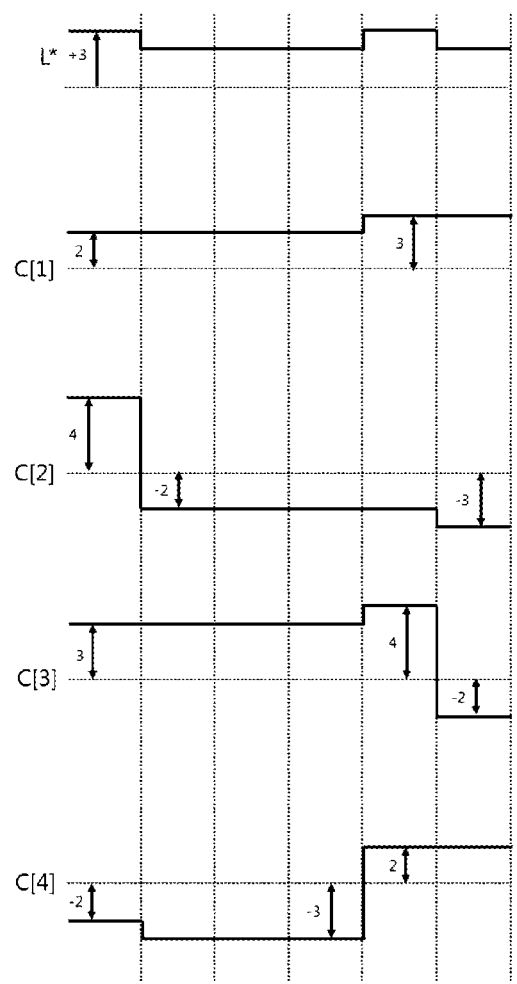
FIG. 15 is a diagram showing an example of behavior of the process of counter calculation according to the fourth embodiment.

FIG. 15 shows an example of behavior of the counter calculation operation (3) according to the fourth embodiment. As in the third embodiment, the counter having the maximum absolute value has a value of ±4 in FIG. 15, whereas the maximum counter value is 7 in FIG. 8. Without unnecessary increment of the counter values, the relative relationship among the ON-output durations and the OFF-output durations can be maintained.

Similar to the case of FIG. 8, at three timings of level shifting, the operations (3)-B, (3)-A, and (3)-B are performed, wherein the cells as targets of assignment are the cell 3, cell 4, and cell 2, respectively.

The first shift of the level command L* indicates a command of ON→OFF, upon which the operation (3)-B is performed. The cell 2 with the counter C[2] having the maximum value of 4 is selected, and the counter C[2] is set to −2. Of the counters C, the counter C[4] being negative is decremented.

The second shift of the level command L* indicates a command of OFF→ON, upon which the operation (3)-A is performed. The cell 4 with the counter C[4] having the minimum value of −3 is selected, and the counter C[4] is set to 2. Of the counters C, the counters C[1] and C[3] being positive are incremented.

The last shift of the level command L* indicates a command of ON→OFF, upon which the operation (3)-B is performed. The cell 3 with the counter C[3] having the maximum value of 4 is selected, and the counter C[3] is set to −2. Of the counters C, the counter C[2] being negative is decremented.

Since incrementing or decrementing is also performed when the level shifts, the counter value immediately after the level shift starts from ±2.

In the fourth embodiment, only the counter calculation operation (3) is modified, and (4) is implemented by the configuration of FIG. 9 (the second embodiment).

With the modifications described above, the switching load distribution control can be realized without the necessity of consideration of overflowing. As in the first embodiment, the detailed calculation method is not limited to FIGS. 14 and 9.

As described above, according to the fourth embodiment, it is possible to optimally distribute the switching load among the cells by the control to preferentially shift the level of the cell having the maximum output duration, by using the counters that record the output durations by positive and negative values in relative relationship.

Furthermore, it can be implemented by a smaller number of registers than in the first embodiment and third and fifth embodiments described below. It also makes it possible to prevent overflowing due to constant increment of counters.

Furthermore, in contrast to patent documents 1 to 3, there are advantages that no table is required, a higher level of distribution is possible than triangular wave comparison based on the PS method, and it is unnecessary to determine cell voltages in advance to switching load distribution control.

<Fifth Embodiment> Although constant incrementing of the counter values causes an overflow problem in the first and second embodiments, the counter values are incremented only when the level shifts in the third and fourth embodiments, which serves to minimize the absolute values of the counter values.

The focus of the third and fourth embodiments is "relative output duration within all cells". Namely, in order to perform switching load distribution control, it is sufficient that the output durations can be ranked among the cells. In the third and fourth embodiments, the output durations among the cells are ranked according to the relative relationship among the counter values. The ranking can be performed by another method.

In the fifth embodiment, switching load distribution is performed in which storage positions in an array are regarded as indicating ordinal ranks.

The following describes the counter calculation operation (3) according to the fifth embodiment. There are two types of counters, an ON-counter and an OFF-counter. Each counter value indicates a cell number, and as an index value of a column where the cell number is stored decreases, the output duration increases with respect to the other cells. In order to represent the relative relationship in the output duration, values in the array are exchanged when the level shifts.

The ON-counter and the OFF-counter each need to have N columns for the number of cell stages N. However, since the number of valid columns changes depending on the output level, zero is stored in invalid columns. For example, when the output level is equal to +2 level, there are two ON cells, cell numbers are stored in the first and second columns of the ON-counter, and zero is stored in the third to Nth columns.

Since stored values represent cell numbers and no increment operation is performed, the name "counter" may be inappropriate. However, it is called a "counter" for convenience in view of its correspondence with the first to fourth embodiments.

Figure 16:
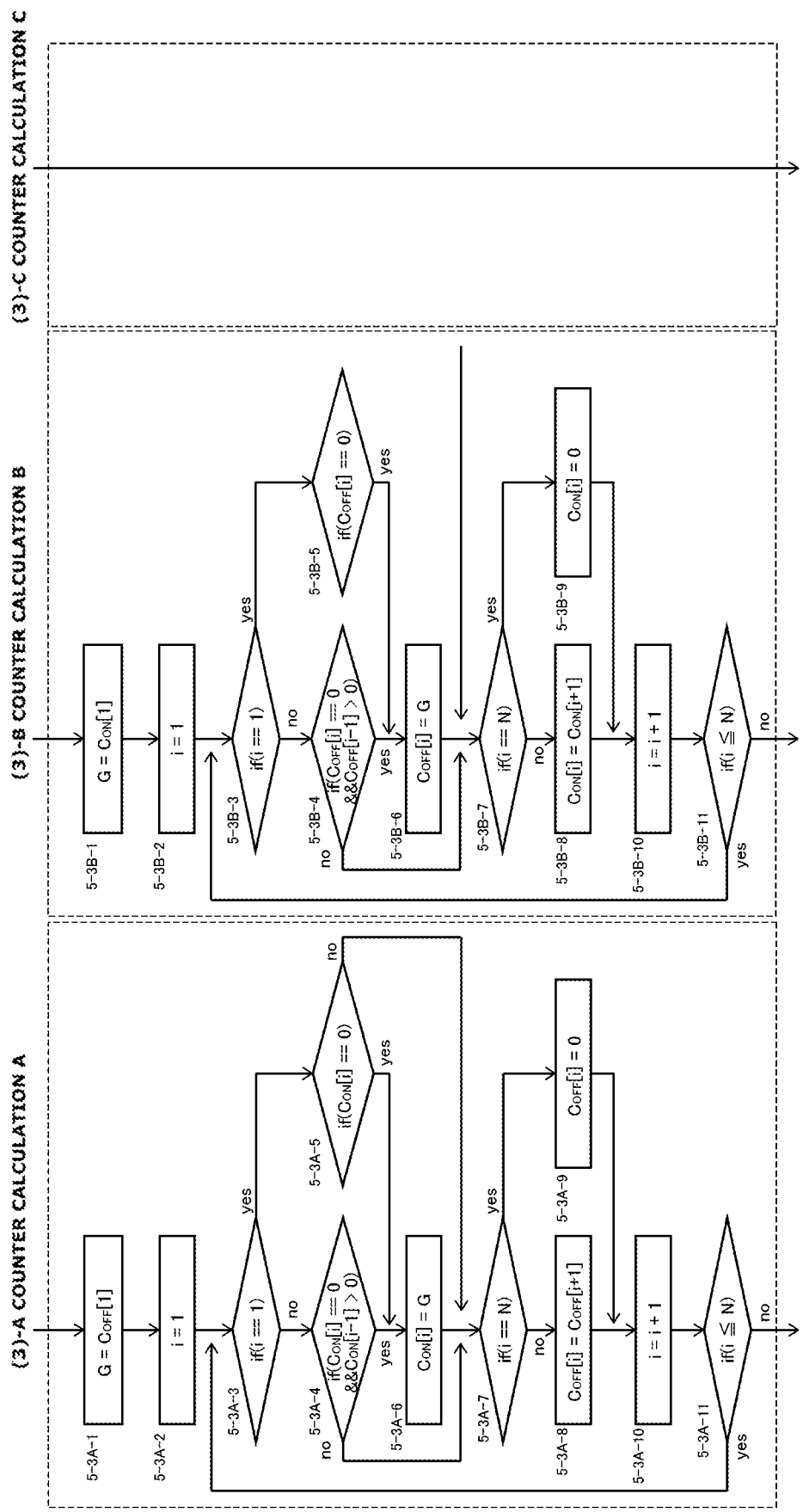
FIG. 16 is a flowchart showing a process of counter calculation according to the fifth embodiment.

FIG. 16 shows a flowchart of the counter calculation operation according to the fifth embodiment. Similar to FIG. 7, this flowchart corresponds to (3) in FIG. 6, wherein there are three types of flowcharts selected depending on the result of the branching at (2). The counter operation is performed for cases of A, B, and C as follows.

<Case (3)-A (OFF→ON)> At 5-3A-1, the value in the first column of the OFF-counter is temporarily stored as G. This means that the cell with the longest OFF duration has been selected.

At 5-3A-2, the index i is set as i=1. At 5-3A-3, it is determined whether or not the index i=1. When i=1, the process proceeds to 5-3A-5, and otherwise the process proceeds to 5-3A-4.

At 5-3A-5, it is determined whether or not the ON-counter $C_{ON}[i]=0$. When $C_{ON}[i]=0$, the process proceeds to 5-3A-6, and otherwise the process proceeds to 5-3A-7.

At 5-3A-4, it is determined whether or not $C_{ON}[i]=0$ and $C_{ON}[i-1]>0$. When both are satisfied, the process proceeds to 5-3A-6, and when at least either one is unsatisfied, the process proceeds to 5-3A-7. At 5-3A-6, G is assigned to the ON-counter $C_{ON}[i]$.

Namely, at 5-3A-3 to 5-3A-6, G is substituted into a rearmost position in the ON-counter. The "rearmost position" corresponds to an index that is one greater than the maximum index with a non-zero value. When all the columns have the value of zero, G is substituted into the first column. This operation causes a level shift with the selected cell having the shortest ON duration.

At 5-3A-7, it is determined whether or not i=N. When i=N, the process proceeds to 5-3A-9, and otherwise the process proceeds to 5-3A-8. At 5-3A-9, $C_{OFF}[i]$ is set as $C_{OFF}[i]=0$, and at 5-3A-8, $C_{OFF}[i]$ is set as $C_{OFF}[i]=C_{OFF}[i+1]$. This is an operation to shift the counter values by one column for filling in response to an event that the cell with the longest OFF duration is turned on. Namely, at 5-3A-7 to 5-3A-9, the OFF-counters in the second and subsequent columns are each shifted to the index one smaller. The value of zero is substituted into the Nth column.

At 5-3A-10, the index i is set as i=i+1. At 5-3A-11, it is determined whether or not the index i is less than or equal to N. When the index i is less than or equal to N, the process returns to 5-3A-3, and when the index i is larger than N, the operation (3)-A is terminated.

<Case (3)-B (ON→OFF)> At 5-3B-1, the value in the first column of the ON-counter is temporarily stored as G. This means that the cell with the longest ON duration has been selected.

Namely, at 5-3B-3 to 5-3B-6, G is substituted into the rearmost position in the OFF-counter. This operation causes a level shift with the selected cell having the shortest OFF duration.

At 5-3B-7 to 5-3B-9, the ON-counters in the second and subsequent columns are each shifted to the index one smaller. The value of zero is substituted into the Nth column. This is an operation to shift the counter values by one column for filling in response to an event that the cell with the longest ON duration is turned off.

<Case (3)-C (no level shift)> In the fifth embodiment, at (3)-C, no operation is performed. In the configuration of the fifth embodiment, it is sufficient to maintain the ranking at the time of level shift, so that no operation is required at the time of no level shift.

Figure 17:
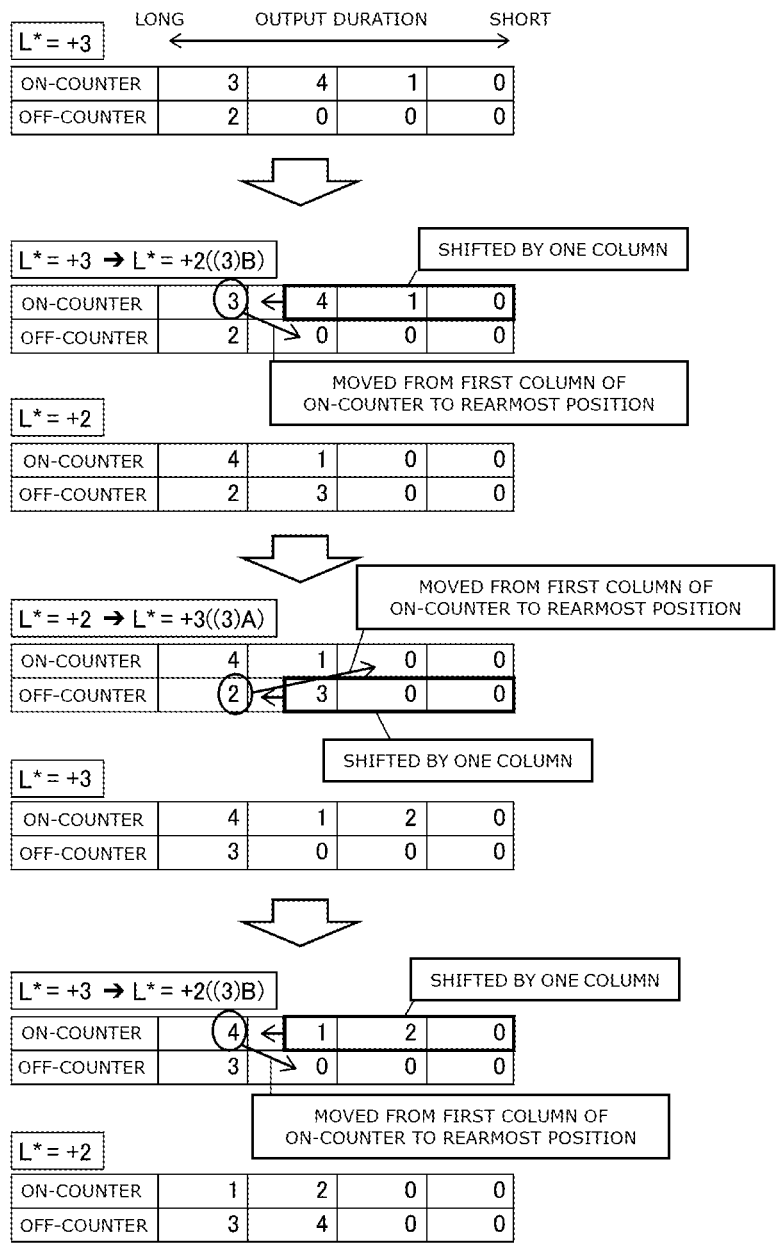
FIG. 17 is a diagram showing an example of behavior of the process of counter calculation according to the fifth embodiment.

FIG. 17 shows an example of behavior of the counter calculation operation (3) according to the fifth embodiment. The first to fourth embodiments are shown in the time chart format for presenting increase of the counter values, but behavior of the fifth embodiment is shown in an array representation for the sake of clarity, because the fifth embodiment has no increment operation. FIG. 17 also shows behavior of operation when the level shifts.

Similar to the case of FIG. 8, at three timings of level shift, the operations (3)-B, (3)-A, and (3)-B are performed wherein cell 3, cell 2, and cell 4 are level-shifted respectively.

The first shift of the level command L* is a shift of +3→+2 (ON→OFF), which is implemented by the operation (3)-B. The cell 3 in the first column of the ON-counter $C_{ON}$ is selected, and moved to the rearmost position in the OFF-counter $C_{OFF}$. In addition, the second and subsequent columns of the ON-counter $C_{ON}$ are shifted by one column for filling.

The second shift of the level command L* is a shift of +2→+3 (OFF→ON), which is implemented by the operation (3)-A. The cell 2 in the first column of the OFF-counter $C_{OFF}$ is selected, and moved to the rearmost position in the ON-counter $C_{ON}$. In addition, the second and subsequent columns of the OFF-counter $C_{OFF}$ are shifted by one column for filling.

The third shift of the level command L* is a shift of +3→+2 (ON→OFF), which is implemented by the operation (3)-B. Namely, the cell 4 in the first column of the ON-counter $C_{ON}$ is selected, and moved to the rearmost position in the OFF-counter $C_{OFF}$. In addition, the second and subsequent columns of the ON-counter $C_{ON}$ are shifted by one column for filling.

It is to be noted that the relationship is maintained in which as the index decreases in the array, the output duration increases, and as the index increases, the output duration decreases.

Next, the following describes the gate signal generation operation (4) according to the fifth embodiment. In the fifth embodiment, the meaning of counter values is changed from that in the first to fourth embodiments, which requires to modify the mechanism of gate signal generation operation.

Figure 18:
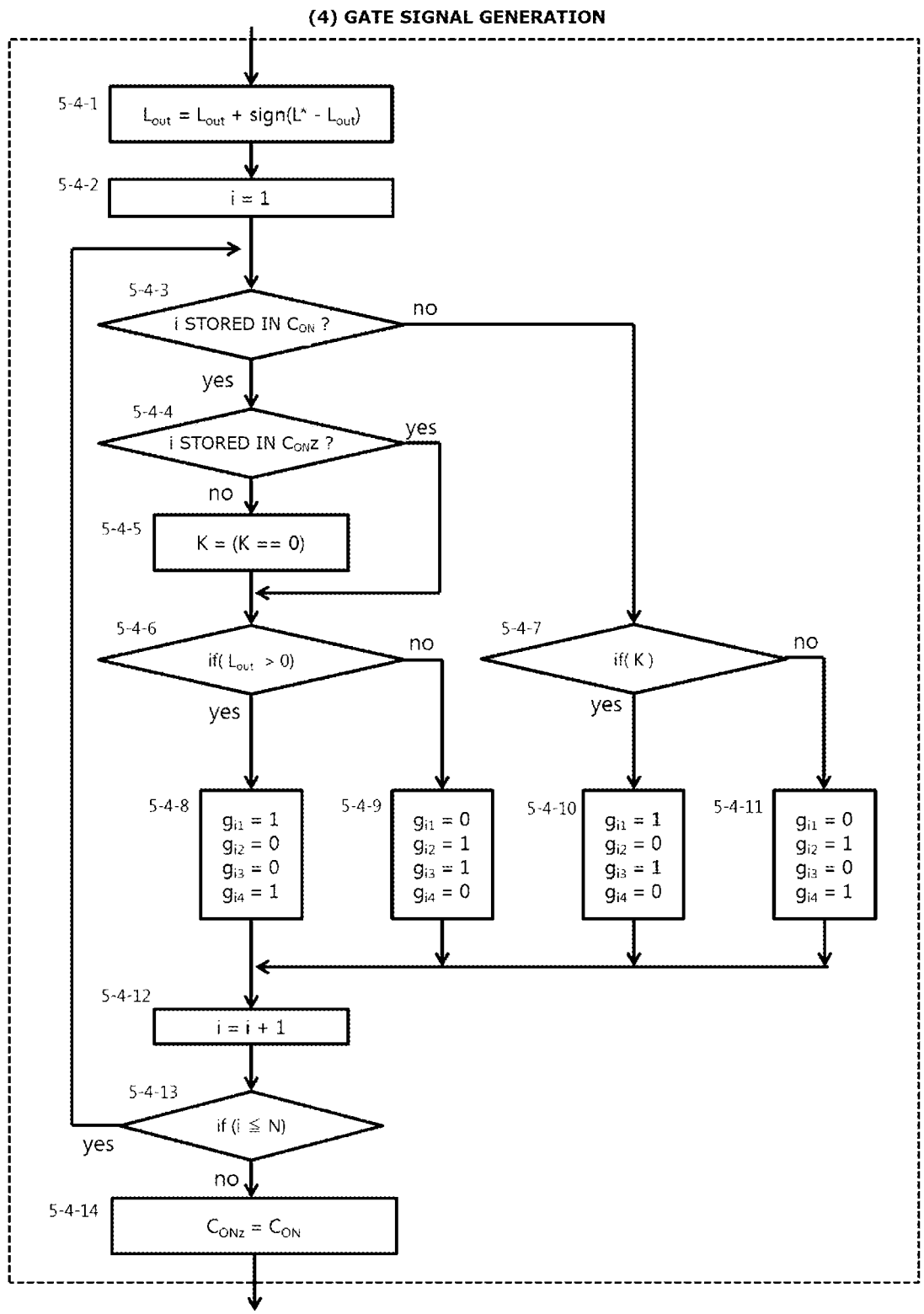
FIG. 18 is a flowchart showing a process of gate signal generation according to the fifth embodiment.

FIG. 18 is a flowchart of the gate signal generation operation (4) according to the fifth embodiment. This flowchart corresponds to (4) in FIG. 6. The definition of symbols is the same as in FIG. 9.

First, what is modified from FIG. 9 is a manner of cell level designation, whereas it is not required to modify the operation related to gate signal designation and the output level Lout after the cell levels are designated. Namely, 5-4-1 to 5-4-2 and 5-4-5 to 5-4-14 are based on the same concept as 1-4-1-1 to 1-4-2 and 1-4-5 to 1-4-14, and description thereof is omitted.

5-4-3 should be branched depending on whether the cell i is ON. This can be implemented by checking whether the value i exists in the ON-counter. When i exists, the cell i is ON, Namely, a gate signal for turning on the cells arranged in the ON-counter is generated, and a gate signal for turning off the cells not arranged in the ON-counter is generated.

5-4-4 is a branch point for inversion of K that designates a zero level mode, wherein a case is to be found where the cell i is turned from OFF to ON. Accordingly, it branches depending on whether or not the value i exists in the ON-counter previous value $C_{ON}z$.

With the modifications described above, the gate signals can be designated in accordance with setting of the counters also in the fifth embodiment.

Incidentally, in the fifth embodiment, the maximum counter value is equal to the number of cell stages N, and there is no possibility that each counter becomes unnecessarily large as in the first embodiment. Therefore, by using FIGS. 16 and 18 of the fifth embodiment in the configuration of FIG. 6, the switching load distribution control can be performed to solve the problem of overflow in the first embodiment.

Furthermore, as in the previous embodiments, the detailed calculation method is not limited to FIGS. 16 and 18.

As described above, according to the fifth embodiment, the switching load of each cell can be distributed optimally by the control to preferentially shift the level of the cell having the maximum output duration by using the array that include storage positions indicating the output durations. In addition, it is possible to prevent overflowing due to constant incrementing of counters.

Furthermore, in contrast to patent documents 1 to 3, there are advantages that no table is required, a higher level of distribution is possible than triangular wave comparison based on the PS method, and it is unnecessary to determine cell voltages in advance to switching load distribution control.

<Sixth Embodiment> In the second and fourth embodiments, by using negative counter values, the number of counters can be reduced as compared with the first and third embodiments. The number of counters can be reduced also in the fifth embodiment by using negative counter values.

However, embodiments handling negative counter values are omitted, because operation can be further simplified while reducing the number of counters in another manner.

In the sixth embodiment, the number of counters is reduced and operation is simplified as compared with the fifth embodiment by changing a counter reference position based on output level information.

The following describes the counter calculation operation (3) according to the sixth embodiment. The counter is set to have N columns corresponding to the number of cell stages N, wherein each counter value indicates a cell number. It is considered that the cells in the output level Lout columns from the rightmost column are cells being ON, and the other cells are cells being OFF. In each of an ON region and an OFF region, a left one of two arbitrary cells is longer in output duration than a right one of the two arbitrary cells.

FIG. 19 summarizes the concept of the counter. When L=+3, the cell 2 is stored in the OFF region, and the cell 3, cell 4, and cell 1 are stored in the ON region. When L=+2, the cells 2 and 3 are stored in the OFF region, and the cells 4 and 1 are stored in the ON region. Even with the same counter values, it varies depending on the output level Lout whether the cell 3 is ON or OFF.

Figure 20:
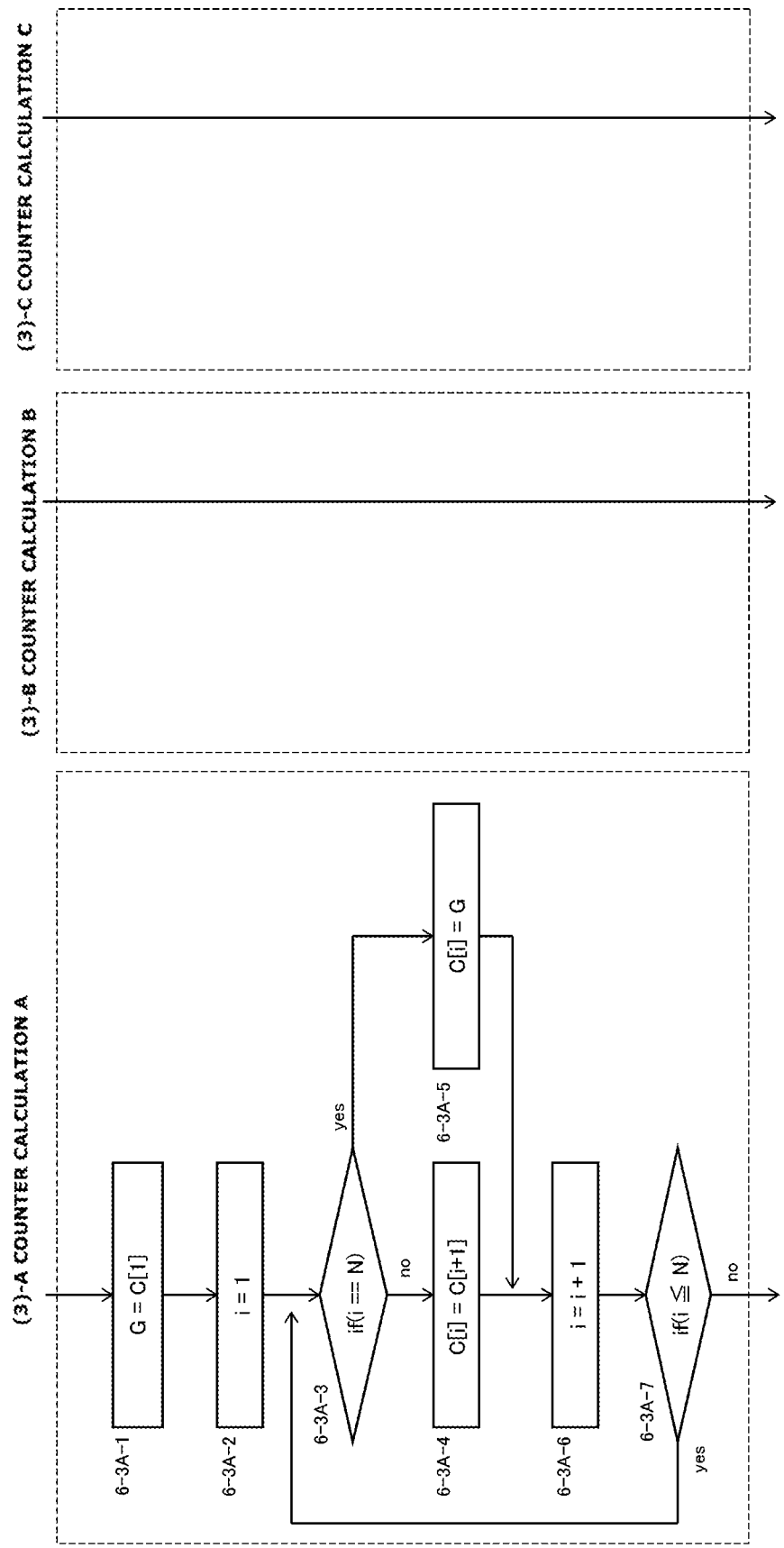
FIG. 20 is a flowchart showing a process of counter calculation according to the sixth embodiment.

FIG. 20 shows a flowchart of the counter calculation operation according to the sixth embodiment. Similar to FIG. 7, this flowchart corresponds to (3) in FIG. 6, wherein there are three types of flowcharts selected depending on the result of the branching at (2). The counter operation is performed for cases of A, B, and C as follows.

<Case (3)-A (OFF→ON)> At 6-3A-1, the value in the first column of the counter is temporarily stored as G. This means that the cell with the longest OFF duration has been selected.

At 6-3A-2, i is set as i=1. At 6-3A-3, it is determined whether or not i=N. When i=N, the process proceeds to 6-3A-5, and otherwise the process proceeds to 6-3A-4.

At 6-3A-5, G is assigned to the last column (Nth column) C[N] of the counter. With this, the level has shifted with the selected cell having the shortest ON duration.

At 6-3A-4, C[i] is set as C[i]=C[i+1], and the counters in the second and subsequent columns are each moved to the next smaller index. This is an operation to move the counter value having the longest OFF duration (in the first column) into the ON region, and accordingly shift the counter values by one column for filling.

At 6-3A-6, the index i is incremented. At 6-3A-7, it is determined whether or not the index i is less than or equal to N. When the index i is less than or equal to N, the process returns to 6-3A-3, and when i is larger than N, the operation (3)-A is terminated.

<Case (3)-B (ON→OFF)> In the sixth embodiment, at (3)-B, no operation is performed. No counter calculation operation (3)-B is required, because when the output level Lout is updated by the gate signal generation operation (4), the OFF region expands and the cell of the maximum output duration in the ON region automatically shifts to an OFF state.

<Case (3)-C (no level shift)> In the sixth embodiment, at (3)-C, no operation is performed. The sixth embodiment is based on the configuration of the fifth embodiment, and in the configuration of the sixth embodiment, it is sufficient to maintain the ranking at the time of level shift, and it is not required to perform operation at the time of no level shift.

Figure 21:
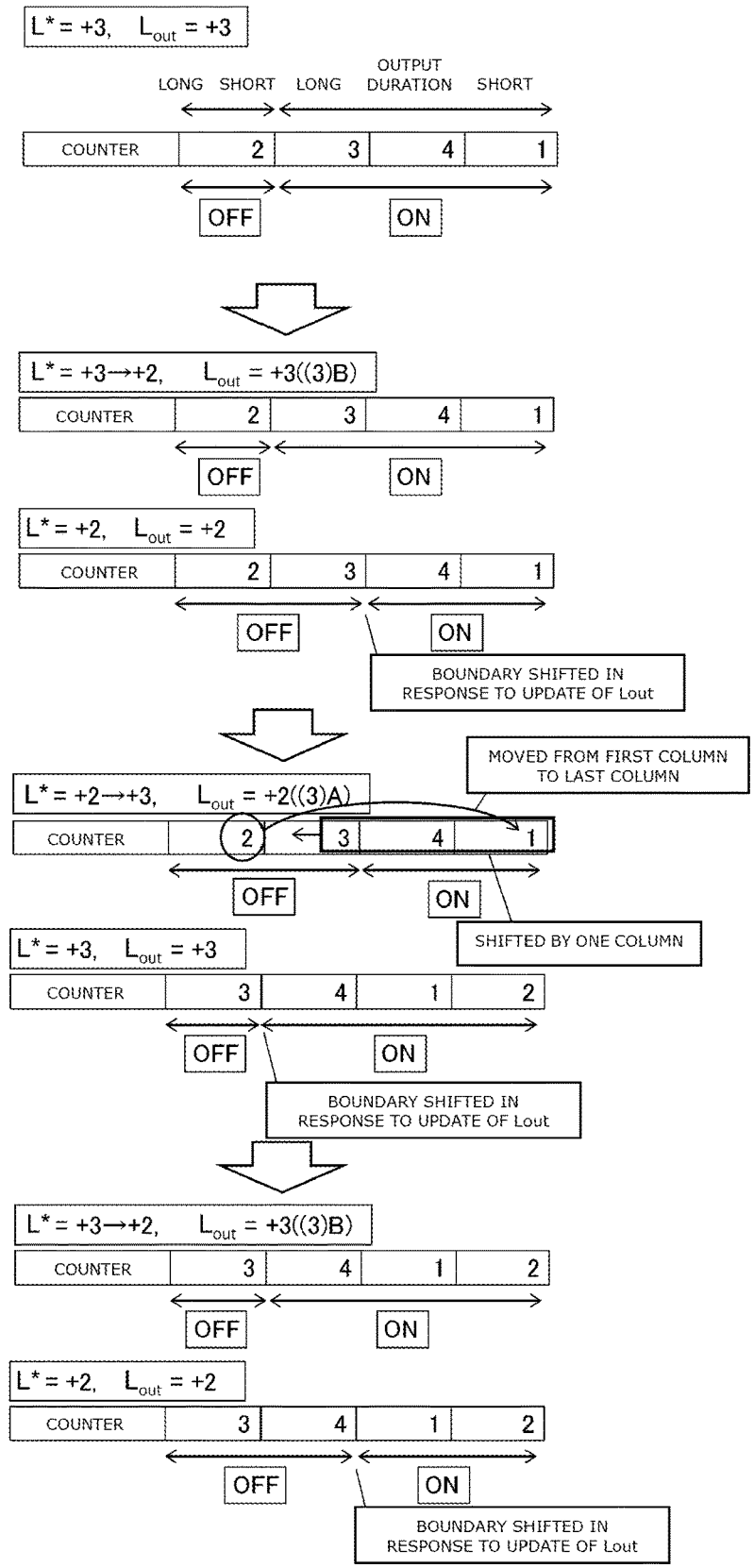
FIG. 21 is a diagram showing an example of behavior of the process of counter calculation according to the sixth embodiment.

FIG. 21 shows an example of behavior of the counter calculation operation (3) according to the sixth embodiment. This is shown in an array representation as in the fifth embodiment. FIG. 21 shows behavior of operation when the level shifts. Similar to the case of FIG. 8, at three timings of level shift, the operations (3)-B, (3)-A, and (3)-B are performed wherein cell 3, cell 2, and cell 4 are level-shifted respectively. The output level Lout is made to follow the level command L* by the gate signal generation operation (4).

The first shift of the level command L* is a shift of +3→+2 (ON→OFF), which is implemented by the operation (3)-B. By the operation (3)-B, the counter array is unchanged. However, a boundary between the ON region and the OFF region shifts, so that the cell 3 belongs to the OFF region.

The second shift of the level command L* is a shift of +2→+3 (OFF→ON), which is implemented by the operation (3)-A. The cell 2 having the maximum OFF-output duration moves to the rearmost position. In addition, the boundary between the ON region and the OFF region shifts.

The last shift of the level command L* is a shift of +3→+2 (ON→OFF), which is implemented by the operation (3)-B. By the operation (3)-B, the counter array is unchanged. However, the boundary between the ON region and the OFF region shifts, so that the cell 4 belongs to the OFF region.

In each of the ON and OFF regions of the array, the relationship is constantly maintained in which as the index decreases, the output duration increases, and as the index increases, the output duration decreases. In addition, except for the cell having the longest output duration, no cell is level-shifted by changes of the ON region and the OFF region.

Next, the following describes the gate signal generation operation (4) according to the sixth embodiment. Similar to the fifth embodiment, cell numbers are stored in the counter, but the introduction of the ON and OFF regions requires modifications to the gate signal generation operation (4).

Figure 22:
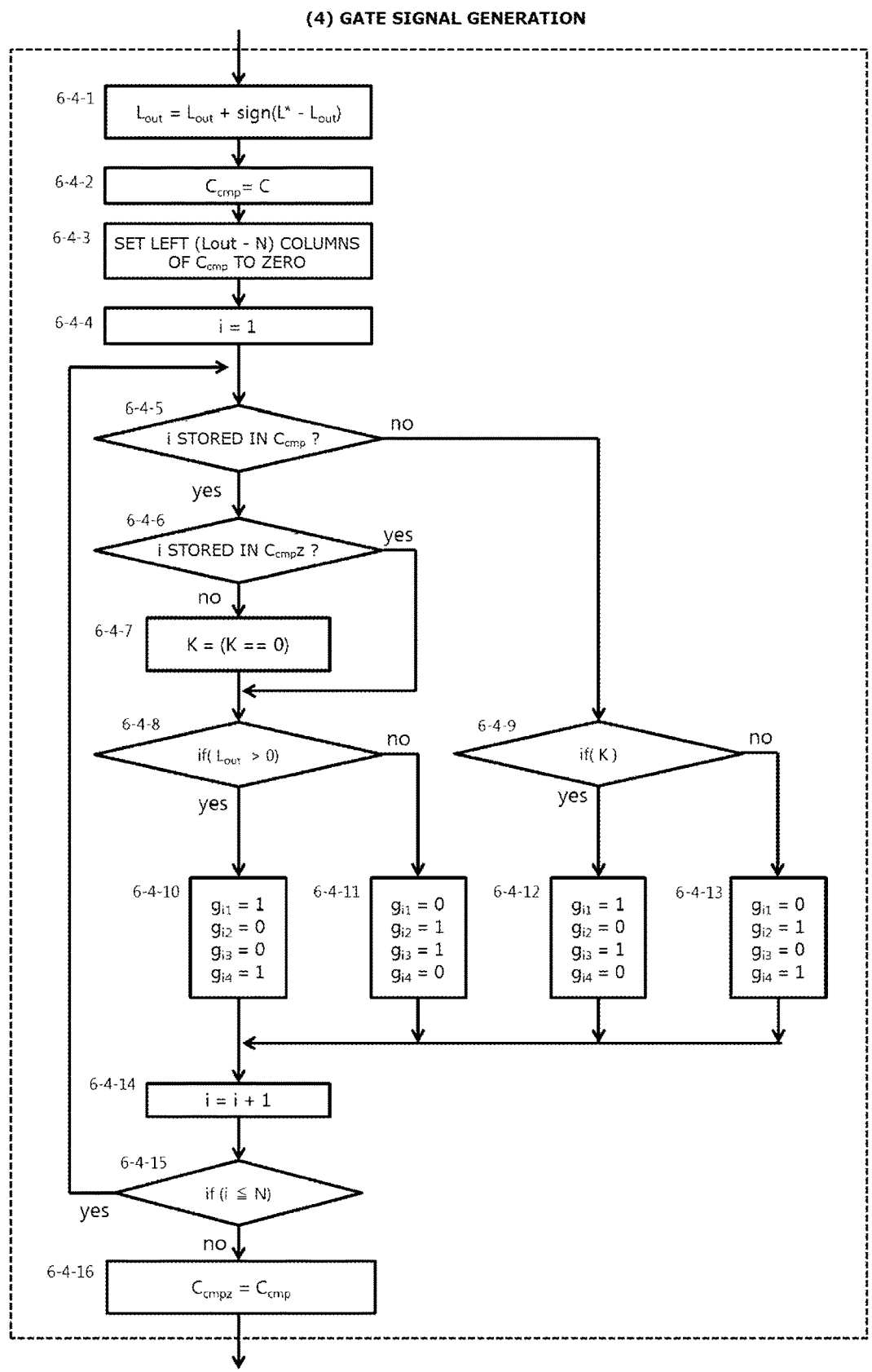
FIG. 22 is a flowchart showing a process of gate signal generation according to the sixth and seventh embodiments.

FIG. 22 shows a flowchart of the gate signal generation operation according to the sixth and seventh embodiments. This flowchart corresponds to (4) in FIG. 6.

The definition of symbols is the same as in FIG. 9. However, in contrast to the first to fourth embodiments shown in FIG. 9, the ON-counter $C_{ON}$ does not exist in the sixth and seventh embodiments, and the counter C exists instead. Furthermore, a correction counter Ccmp and a correction counter previous value Ccmpz are used as new symbols.

6-4-1, 6-4-4, and 6-4-7 to 6-4-16 are based on the same concept as 5-4-1, 5-4-2, and 5-4-5 to 5-14 of the fifth embodiment, and description thereof is omitted.

6-4-2 and 6-4-3 are operations to generate a quantity equivalent to the ON-counter of the fifth embodiment. A temporary correction counter Ccmp is created separately from counter values to be held, and contents of the counter C are temporarily copied to the correction counter Ccmp. Then, columns corresponding to the OFF region (1st to (Lout-N)th columns) are set to zero.

By this operation, only the number of each cell to be turned on remains in the correction counter Ccmp, and the output level of the cell can be designated.

At 6-4-2, array assignment is performed, which is not assignment of a start address of an array as found in C language descriptions, but is implemented by appropriately copying the contents of the array.

6-4-5 and 6-4-6 are operations for cell level designation, and are implemented by the same manner as 5-4-3, 5-4-4, because by the operations 6-4-2 and 6-4-3, the correction counter Ccmp corresponds to the ON-counter according to the fifth embodiment. Namely, when the value i exists in the counter, the cell i is ON, Therefore, the gate signal of each cell arranged in the ON region can be turned ON, and the gate signal of each cell not arranged in the ON region can be turned OFF.

With the modifications described above, the gate signals can be designated in accordance with setting of the counters also in the sixth embodiment.

The counter may be configured to have an ON region on the left side and an OFF region on the right side, or may be configured in which a left one of two arbitrary cell numbers has a shorter output duration than a right one of the two arbitrary cell numbers. This setting is arbitrary, but for example, in a configuration in which the ON region is provided on the left side and the OFF region is provided on the right side, the operation (3)-A is eliminated, and at (3)-B, the value in the first column is substituted into the last column. It is to be noted that the configuration of the counter calculation operation is to be modified in this way.

In addition, depending on combination of how to set the ON region and the OFF region and how to handle the length of the output duration, the ON region and the OFF region may be discontinuous from each other instead of a continuous region of the array, so that additional operation may be required.

The fifth embodiment employs the 2N counters, but it is sufficient that the sixth embodiment employs N counters. As compared with the fifth embodiment, the operation (3)-B is omitted and as can be seen by comparing (3)-A of FIG. 16 and (3)-A of FIG. 20, the number of operations is also reduced at (3)-A.

Therefore, by using FIGS. 20 and 22 of the sixth embodiment in the configuration of FIG. 6, it is possible to realize the switching load distribution control in which the number of counters is halved from that of the fifth embodiment and calculating operation is simplified. As in the previous embodiments, the detailed calculation method is not limited to FIGS. 20 and 22.

As described above, according to the sixth embodiment, the switching load of each cell can be distributed optimally by the control to preferentially shift the level of the cell having the maximum output duration by using the array that include storage positions indicating the output durations.

In addition, it is possible to prevent overflowing due to constant incrementing of counters. Furthermore, it can be implemented with a smaller number of registers than the first, third, and fifth embodiments. Furthermore, the process can be simplified as compared with the first to fifth embodiments.

Furthermore, in contrast to patent documents 1 to 3, there are advantages that no table is required, a higher level of distribution is possible than triangular wave comparison based on the PS method, and it is unnecessary to determine cell voltages in advance to switching load distribution control.

<Seventh Embodiment> In the first to sixth embodiments, the flowchart is designed so as to constantly select the cell having the longest output duration with higher priority and shift the level of the selected cell. However, a problem may occur, when the number of switching operations is very small for one cycle of the output voltage (one cycle of the fundamental wave) and switching is performed in synchronization with the output voltage.

Figure 23:
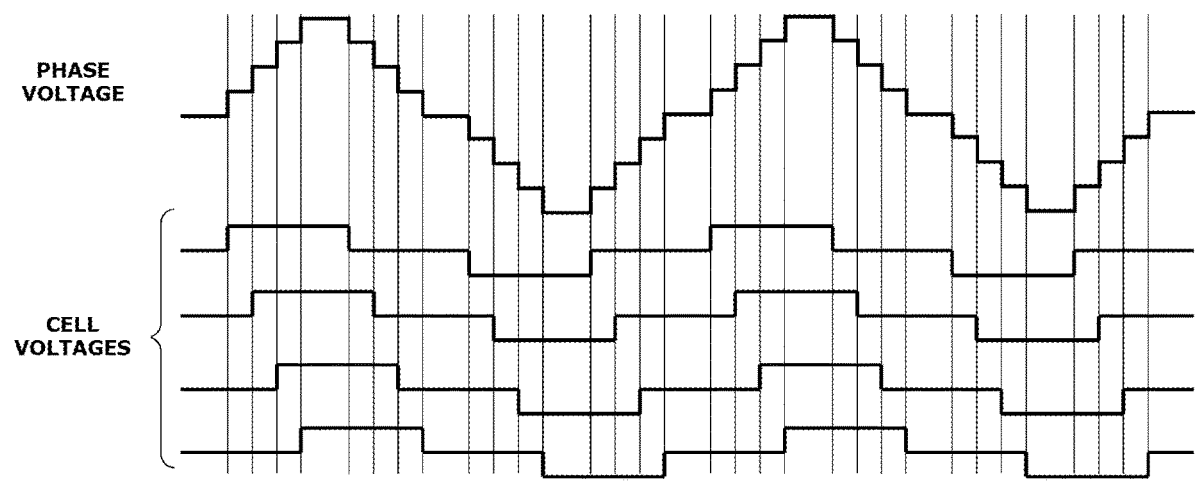
FIG. 23 is a diagram showing an example of switching in which cell voltages are unchanged among cycles.

FIG. 23 shows an example of switching that causes a problem. FIG. 23 shows an example of four stages of cells, in which the phase voltage shifts in level four times in a quarter cycle, and a synchronous output is made with sinusoidal symmetry. In this situation, the cells are switched in order of increasing output duration, wherein it can be seen from comparison among the cell voltages, each cell is in charge of the same part of each fundamental wave in two cycles. If the waveform continues steadily, each cell voltage is to be in charge of the same part every cycle. Namely, the output timing of each cell is fixed in each cycle.

When a cell is turned on, an electric current flows in a path through the capacitor, and a DC voltage fluctuates according to the polarity of the electric current. If the number of switching operations is large or if switching is performed at random timings, the polarity during the ON period is not fixed, and the DC voltage is likely to be maintained averaged. However, when the output timing of the cell is fixed in conformance with one cycle of the fundamental wave, the ON timing and the current polarity of the cell are fixed. Accordingly, the DC voltage fluctuation in each cycle has the same polarity, thereby causing a problem that the DC voltage becomes equal to zero or continues to rise.

In order to avoid this problem, the seventh embodiment is configured to intentionally deviate, from optimal designation, designation of a cell whose level is to be shifted, and thereby prevent the occurrence of a problem in the DC voltage. If the deviation from the optimal designation is implemented, for example, by random selection of a cell, a problem may occur wherein the degree of switching load distribution is locally adversely affected, and the loss cannot be equalized.

Therefore, the following studies a control that is appropriately deviated from the optimal point by making modifications to the embodiments of the present invention described above. In the following, a case is explained where a simple modification is made to the sixth embodiment.

Figure 24:
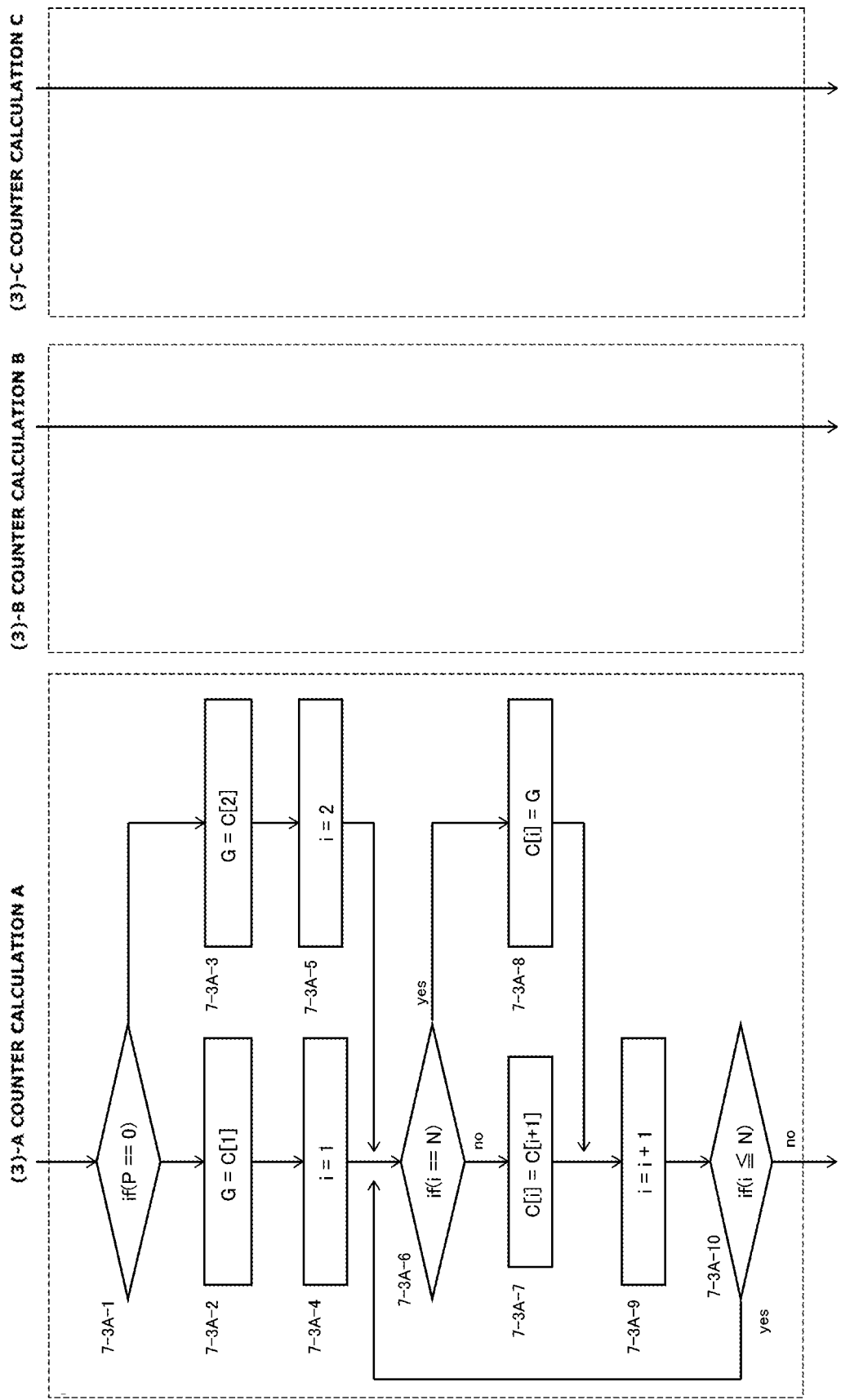
FIG. 24 is a flowchart showing a process of counter calculation according to the seventh embodiment.

First, the following describes the counter calculation operation (3). FIG. 24 shows a flowchart of the counter calculation operation according to the seventh embodiment. Similar to FIG. 7, this flowchart corresponds to (3) in FIG. 6, and there are three types of flowcharts selected depending on the result of the branching at (2).

As shown in FIG. 24, a variable P is added to 7-3A-1. P is a priority change switch and is a logical value.

At 7-3A-1, it is determined whether or not the priority change switch P is equal to zero. When the priority change switch P=0, at 7-3A-2, the value in the first column of the counter is substituted into G as in the sixth embodiment. When the priority change switch P=1, at 7-3A-3, the value in the second column is substituted into G. This makes it possible to perform not only the operation of selecting the cell having the longest OFF duration but also the operation of selecting the cell having the second longest OFF duration.

The priority change switch P is basically set to zero, so that the cell having the longest output duration is selected to perform optimal switching load distribution. When the switching causes a problem, the priority change switch P is appropriately switched to 1. For example, the priority change switch P may be switched between 1 and 0 every half cycle of the fundamental wave. However, it is to be noted that for shifting to the ±N level, which is the maximum level of the N-stage configuration, inappropriate cell designation occurs unless the priority change switch P is set to zero.

At 7-3A-4, the index i is set as i=1, and at 7-3A-5, the index i is set as i=2. At 7-3A-5, the loop is started by the second column, because the second column is prioritized and the element of the first column is not to be shifted.

At 7-3A-6 to 7-3A-10, similar to 6-3A-3 to 6-3A-7 of the sixth embodiment, the designated cell is moved to the last column, and the other cells are shifted by one column for filling. The foregoing is the method of counter calculation operation that deviates from the optimum.

Figure 25:
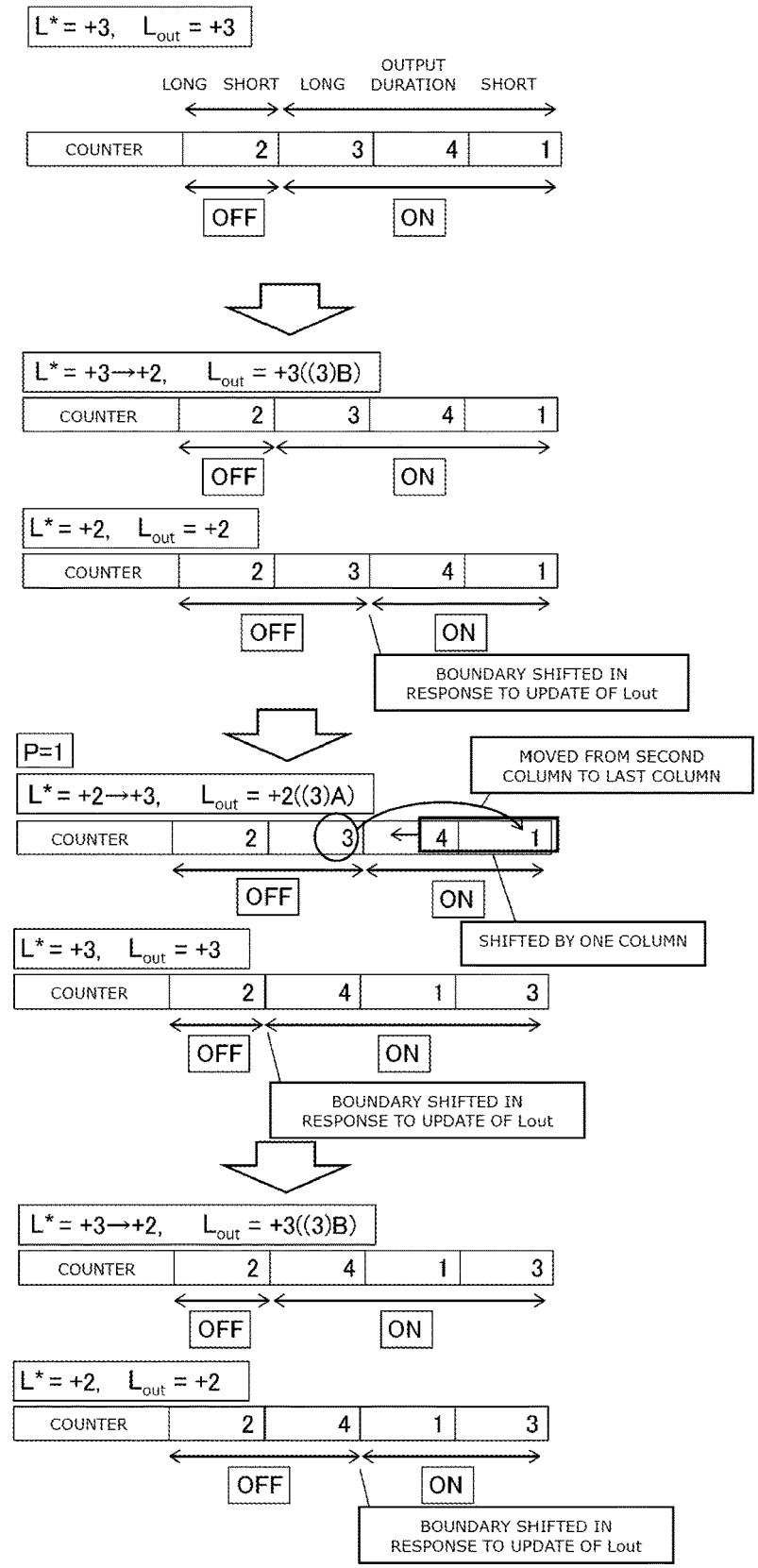
FIG. 25 is a diagram showing an example of behavior of the process of counter calculation according to the seventh embodiment.

FIG. 25 shows an example of behavior of the counter calculation operation according to the seventh embodiment. Since the seventh embodiment is based on the sixth embodiment, the operation behaves almost in the same manner as in FIG. 21. However, since P=1 is set, the second level shift is implemented by selecting and turning on the cell 3 in the second column. In the sixth embodiment, the cell 3, cell 2, and cell 4 are level-shifted, but in the seventh embodiment, the cell 3, cell 3, and cell 4 are level-shifted. Also in the seventh embodiment, the relative relationship among the output durations is not broken but maintained.

The foregoing describes the counter calculation operation (3) according to the seventh embodiment. The gate signal generation operation (4) can be used as it is in FIG. 22, so that by using FIGS. 24 and 22 in FIG. 6, it is possible to perform the switching load distribution control deviated from the optimum.

Although the method is implemented by selecting the cell having the second longest output duration in case of OFF→ON, the method may be implemented by selecting the second cell in case of ON→OFF. Furthermore, in case of deviation, the cell having the third or subsequent largest output duration may be selected.

Furthermore, although the method of deviation has been discussed based on the sixth embodiment, the method may be based on the first to fifth embodiments, because the essence of this control is to intentionally select the cell deviated from the optimum. As in the previous embodiments, the detailed calculation method is not limited to FIG. 24.

As described above, according to the seventh embodiment, high-level distribution in the switching load among the cells can be achieved by the control to preferentially shift the level of the cell having the maximum output duration by using the array that include storage positions indicating the output durations. In addition, it is possible to prevent overflowing due to constant incrementing of counters.

Furthermore, it can be implemented with a smaller number of registers than the first, third, and fifth embodiments. Furthermore, the process can be simplified as compared with the first to fifth embodiments. Furthermore, it is possible to prevent an abnormality in DC voltage when the number of switching operations in one cycle of the fundamental wave is small.

Furthermore, in contrast to patent documents 1 to 3, there are advantages that no table is required, a higher level of distribution is possible than triangular wave comparison based on the PS method, and it is unnecessary to determine cell voltages in advance to switching load distribution control.

<Eighth Embodiment> The first to seventh embodiments described above are premised on the case where the output level is shifted by 1 or unchanged every cycle in which the switching load distribution control is executed. However, this control based on that cycle cannot follow a situation where the level command L* shifts by 2 or more in one cycle.

For driving of a serial multiplex inverter, it is preferable to avoid a two-step shift in voltage, because it raises a surge voltage at a load such as a motor and thereby causes a risk of dielectric breakdown. However, this problem of dielectric breakdown can be avoided by taking measures such as using an LC filter that is prepared in sufficient consideration of the surge voltage.

Furthermore, with regard to triangular wave comparison PWM for a multi-stage serial multiplex inverter, when a maximum voltage level is used in a state where a fundamental wave frequency and a carrier frequency are close to each other, it is inevitable that a voltage shifts by two or more steps at a time. If a gate signal is outputted while avoiding such two-step shifting, the voltage rises with delay, which causes a voltage error.

Therefore, if there is no problem of dielectric breakdown, it is desirable to output a voltage shift by two or more steps without delay, in view of such a voltage error. In the eighth embodiment, a study is made about a configuration for achieving a two-step shift.

Figure 26:
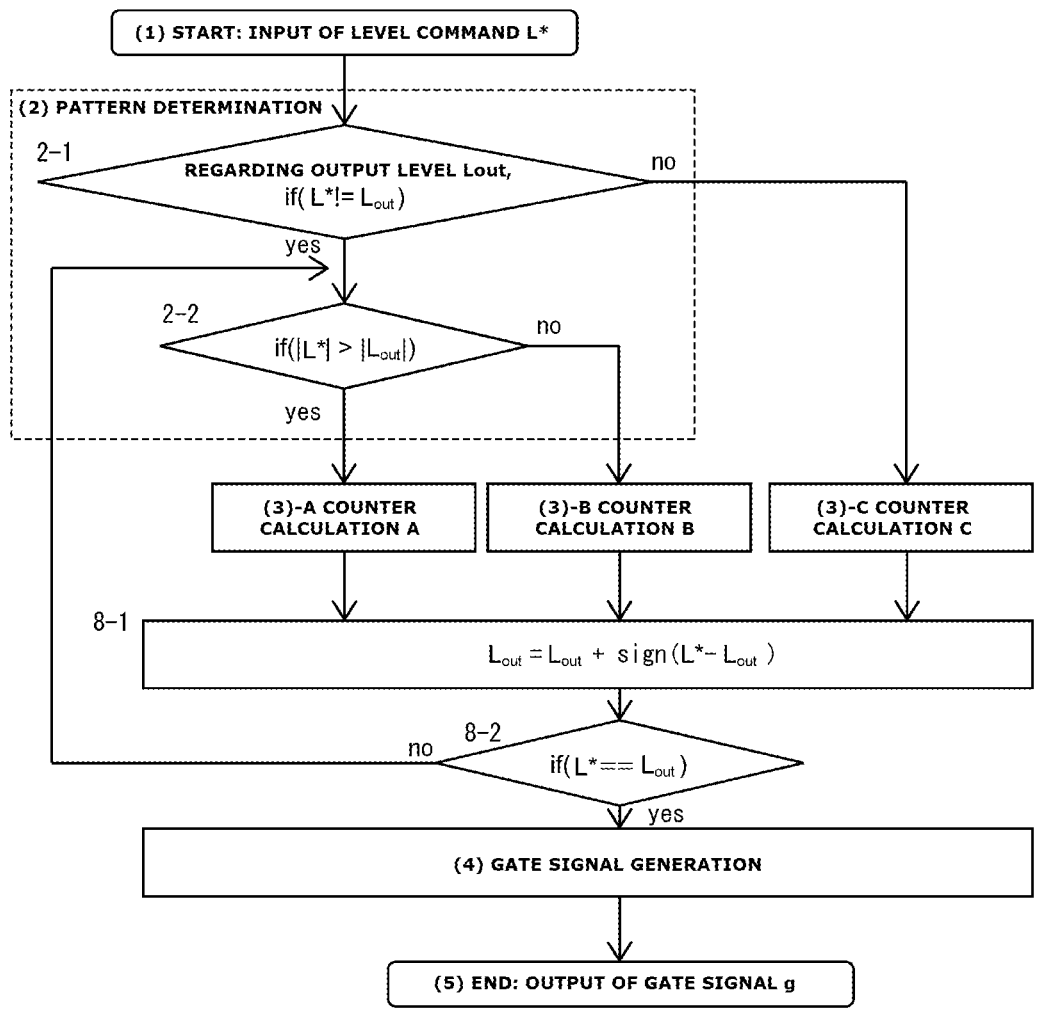
FIG. 26 is a flowchart showing a process of switching load distribution control according to an eighth embodiment.
Figure 27:
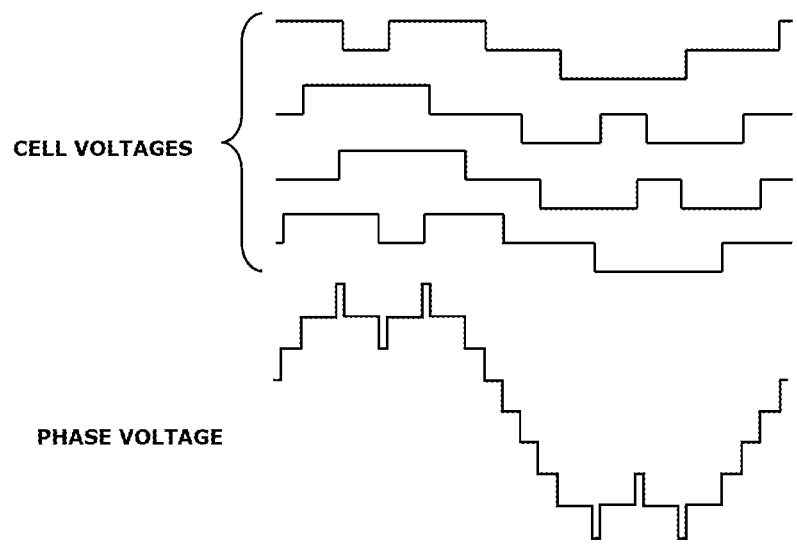
FIG. 27 is a diagram showing an example of relationship between a phase voltage and cell voltages in a serial multiplex inverter.

FIG. 26 shows a flowchart of the switching load distribution control according to the eighth embodiment. Similar to FIG. 6, this flowchart shows an overall flow of the switching load distribution control. The level command L* is inputted, and the gate signal g is outputted. (3) and (4) are configured as in the first to seventh embodiments. With respect to FIG. 6, it is modified that 8-1 and 8-2 are added after the counter calculation operation (3).

At 8-1, the output level Lout is brought closer to the level command L* by one step. At S8-2, it is confirmed whether the output level Lout and the level command L* are equal to each other. When the output level Lout and the level command L* are equal to each other, the process proceeds to a gate signal generation operation (4), and otherwise an operation 2-2 and a counter calculation operation (3) are performed again. With this loop, the counter calculation operation is repeatedly performed until the output level Lout becomes equal to the level command L*.

The counter calculation operation (3) and the gate signal generation operation (4) may be implemented by any of the first to seventh embodiments. The gate signal generation operation (4) includes an operation of Lout=Lout+sign(L*−Lout) at the beginning. This may be omitted because it has already been done at S8-1. However, there is no problem even if this operation is not omitted, because the gate signal generation operation (4) starts in a state where the output level Lout and the level command L* are equal to each other, and no particular effect is caused even with this operation.

The foregoing describes the configuration of the eighth embodiment that can perform the switching load distribution control capable of following the level command L* in one control cycle according to FIG. 26. As in the previous embodiments, the detailed calculation method according to the eighth embodiment is not limited to FIG. 26.

As described above, according to the eighth embodiment, high-level distribution in the switching load among the cells can be achieved by the control to preferentially shift the level of the cell having the maximum output duration by using the array that include storage positions indicating the output durations.

Furthermore, when used in combination with the sixth embodiment, it is possible to prevent overflowing due to constant incrementing of counters. Moreover, it can be implemented with a smaller number of registers than the first, third, and fifth embodiments. Furthermore, the process can be simplified as compared with the first to fifth embodiments.

Furthermore, when used in combination with the seventh embodiment, it is possible to prevent an abnormality in DC voltage when the number of switching operations in one cycle of the fundamental wave is small. In addition, it is possible to follow a two-step shift in voltage without delay.

Furthermore, in contrast to patent documents 1 to 3, there are advantages that no table is required, a higher level of distribution is possible than triangular wave comparison based on the PS method, and it is unnecessary to determine cell voltages in advance to switching load distribution control.

Although the present invention is detailed above only with reference to the specific embodiments, it is clear to those skilled in the art that various modifications can be made within the scope of technical substance of the present invention. Naturally, such modifications belong to the scope of the patent claims.

The invention claimed is:

1. A control device for a serial multiplex inverter in which each of phases includes cells connected serially, wherein each of the cells includes switching elements and is configured to output a level of +1, a level of zero, and a level of −1 as output levels by operation of the switching elements, the control device comprising:
 a high level control section configured to produce a level command based on a command value;
 a switching load distribution control section configured to:
 store information about an ON-output duration of each of the cells and information about an OFF-output duration of each of the cells;
 for a shift pattern from ON to OFF in the cells, put OFF a gate signal for one of the cells whose ON-output duration is the longest of the cells;
 for a shift pattern from OFF to ON in the cells, put ON a gate signal for one of the cells whose OFF-output duration is the longest of the cells;
 perform a pattern determination operation based on the level command and an output level, wherein the pattern determination operation is to select one of a pattern A, a pattern B, and a pattern C, wherein the pattern A is to cause a shift from OFF to ON in the cells, wherein the pattern B is to cause a shift from ON to OFF in the cells, and wherein the pattern C is to cause no level shift;

perform a counter calculation operation to process the information about the ON-output duration and the information about the OFF-output duration, based on the selection of the pattern determination operation;

perform a gate signal generation operation to generate a gate signal, based on the information about the ON-output duration and the information about the OFF-output duration;

wherein each of the cells has a cell number;

wherein the counter calculation operation is implemented by:

provide a counter as the information about the ON-output duration and the information about the OFF-output duration, wherein the counter is an array having columns equal in number to the cells and including an OFF-region and an ON-region, wherein the cell number of each of the cells being OFF is arranged in the OFF-region in a descending order of the OFF-output duration from a first one of the columns, and wherein the cell number of each of the cells being ON is arranged in the ON-region in a descending order of the ON-output duration from one of the columns next to the last column of the OFF-region;

for the pattern A, moving one of the cell numbers arranged in the OFF-region which corresponds to one of the cells whose OFF-output duration is the largest of the cells to a rearmost position in the ON-region, shifting by one column the remaining cell numbers in a direction where the output duration increases, and shifting a boundary between the OFF-region and the ON-region in a direction to reduce the OFF-region by one and increase the ON-region by one;

for the pattern B, shifting the boundary between the OFF-region and the ON-region in a direction to increase the OFF-region by one and reduce the ON-region by one;

for the pattern C, performing no operation;

wherein the gate signal generation operation is implemented by generating a gate signal to put ON each of the cells whose cell number is arranged in the ON-region, and generating a gate signal to put OFF each of the cells whose cell number is not arranged in the ON-region;

wherein each of the cells is defined as being ON when the each of the cells is equal in output level to the level of +1 or the level of −1; and wherein each of the cells is defined as being OFF when the each of the cells is equal in output level to the level of zero.

2. A control device for a serial multiplex inverter in which each of phases includes cells connected serially, wherein each of the cells includes switching elements and is configured to output a level of +1, a level of zero, and a level of −1 as output levels by operation of the switching elements, the control device comprising:

a high level control section configured to produce a level command based on a command value;

a switching load distribution control section configured to:

store information about an ON-output duration of each of the cells and information about an OFF-output duration of each of the cells;

for a shift pattern from ON to OFF in the cells, put OFF a gate signal for one of the cells whose ON-output duration is the longest of the cells;

for a shift pattern from OFF to ON in the cells, put ON a gate signal for one of the cells whose OFF-output duration is the longest of the cells;

perform a pattern determination operation based on the level command and an output level, wherein the pattern determination operation is to select one of a pattern A, a pattern B, and a pattern C, wherein the pattern A is to cause a shift from OFF to ON in the cells, wherein the pattern B is to cause a shift from ON to OFF in the cells, and wherein the pattern C is to cause no level shift;

perform a counter calculation operation to process the information about the ON-output duration and the information about the OFF-output duration, based on the selection of the pattern determination operation;

perform a gate signal generation operation to generate a gate signal, based on the information about the ON-output duration and the information about the OFF-output duration;

wherein each of the cells has a cell number;

wherein the counter calculation operation is implemented by:

providing a counter as the information about the ON-output duration and the information about the OFF-output duration, wherein the counter is an array having columns equal in number to the cells and including an ON-region and an OFF-region, wherein the cell number of each of the cells being ON is arranged in the ON-region in a descending order of the ON-output duration from a first one of the columns, and wherein the cell number of each of the cells being OFF is arranged in the OFF-region in a descending order of the OFF-output duration from one of the columns next to the last column of the ON-region;

for the pattern A, shifting a boundary between the OFF-region and the ON-region in a direction to increase the ON-region by one and reduce the OFF-region by one;

for the pattern B, moving one of the cell numbers arranged in the ON-region which corresponds to one of the cells whose ON-output duration is the largest of the cells to a rearmost position in the OFF-region, shifting by one column the remaining cell numbers in a direction where the output duration increases, and shifting the boundary between the OFF-region and the ON-region in a direction to reduce the ON-region by one and increase the OFF-region by one; and for the pattern C, performing no operation; and wherein the gate signal generation operation is implemented by generating a gate signal to put ON each of the cells whose cell number is arranged in the ON-region, and generating a gate signal to put OFF each of the cells whose cell number is not arranged in the ON-region wherein each of the cells is defined as being ON when the each of the cells is equal in output level to the level of +1 or the level of −1; and wherein each of the cells is defined as being OFF when the each of the cells is equal in output level to the level of zero.

3. A control device for a serial multiplex inverter in which each of phases includes cells connected serially, wherein each of the cells includes switching elements and is configured to output a level of +1, a level of zero, and a level of −1 as output levels by operation of the switching elements, the control device comprising:

a high level control section configured to produce a level command based on a command value;

a switching load distribution control section configured to:

store information about an ON-output duration of each of the cells and information about an OFF-output duration of each of the cells;

for a shift pattern from ON to OFF in the cells, put OFF a gate signal for one of the cells whose ON-output duration is the longest of the cells;

for a shift pattern from OFF to ON in the cells, put ON a gate signal for one of the cells whose OFF-output duration is the longest of the cells;

perform a pattern determination operation based on the level command and an output level, wherein the pattern determination operation is to select one of a pattern A, a pattern B, and a pattern C, wherein the pattern A is to cause a shift from OFF to ON in the cells, wherein the pattern B is to cause a shift from ON to OFF in the cells, and wherein the pattern C is to cause no level shift;

perform a counter calculation operation to process the information about the ON-output duration and the information about the OFF-output duration, based on the selection of the pattern determination operation;

repeat the counter calculation operation when the level command and the output level are different from each other by two or more levels;

perform a gate signal generation operation to generate a gate signal, based on the information about the ON-output duration and the information about the OFF-output duration;

each of the cells has a cell number;

the counter calculation operation is implemented by:

providing a counter as the information about the ON-output duration and the information about the OFF-output duration, wherein the counter is an array having columns equal in number to the cells and including an OFF-region and an ON-region, wherein the cell number of each of the cells being OFF is arranged in the OFF-region in a descending order of the OFF-output duration from a first one of the columns, and wherein the cell number of each of the cells being ON is arranged in the ON-region in a descending order of the ON-output duration from one of the columns next to the last column of the OFF-region;

for the pattern A, moving one of the cell numbers arranged in the OFF-region which corresponds to one of the cells whose OFF-output duration is the largest of the cells to a rearmost position in the ON-region, shifting by one column the remaining cell numbers in a direction where the output duration increases, and shifting a boundary between the OFF-region and the ON-region in a direction to reduce the OFF-region by one and increase the ON-region by one;

for the pattern B, shifting the boundary between the OFF-region and the ON-region in a direction to increase the OFF-region by one and reduce the ON-region by one;

for the pattern C, performing no operation;

wherein the gate signal generation operation is implemented by generating a gate signal to put ON each of the cells whose cell number is arranged in the ON-region, and generating a gate signal to put OFF each of the cells whose cell number is not arranged in the ON-region;

wherein each of the cells is defined as being ON when the each of the cells is equal in output level to the level of +1 or the level of −1; and wherein each of the cells is defined as being OFF when the each of the cells is equal in output level to the level of zero.

4. A control device for a serial multiplex inverter in which each of phases includes cells connected serially, wherein each of the cells includes switching elements and is configured to output a level of +1, a level of zero, and a level of −1 as output levels by operation of the switching elements, the control device comprising:

a high level control section configured to produce a level command based on a command value;

a switching load distribution control section configured to:

store information about an ON-output duration of each of the cells and information about an OFF-output duration of each of the cells;

for a shift pattern from ON to OFF in the cells, put OFF a gate signal for one of the cells whose ON-output duration is the longest of the cells;

for a shift pattern from OFF to ON in the cells, put ON a gate signal for one of the cells whose OFF-output duration is the longest of the cells;

perform a pattern determination operation based on the level command and an output level, wherein the pattern determination operation is to select one of a pattern A, a pattern B, and a pattern C, wherein the pattern A is to cause a shift from OFF to ON in the cells, wherein the pattern B is to cause a shift from ON to OFF in the cells, and wherein the pattern C is to cause no level shift;

perform a counter calculation operation to process the information about the ON-output duration and the information about the OFF-output duration, based on the selection of the pattern determination operation;

repeat the counter calculation operation when the level command and the output level are different from each other by two or more levels;

perform a gate signal generation operation to generate a gate signal, based on the information about the ON-output duration and the information about the OFF-output duration;

each of the cells has a cell number;

the counter calculation operation is implemented by:

providing a counter as the information about the ON-output duration and the information about the OFF-output duration, wherein the counter is an array having columns equal in number to the cells and including an ON-region and an OFF-region, wherein the cell number of each of the cells being ON is arranged in the ON-region in a descending order of the ON-output duration from a first one of the columns, and wherein the cell number of each of the cells being OFF is arranged in the OFF-region in a descending order of the OFF-output duration from one of the columns next to the last column of the ON-region;

for the pattern A, shifting a boundary between the OFF-region and the ON-region in a direction to increase the ON-region by one and reduce the OFF-region by one;

for the pattern B, moving one of the cell numbers arranged in the ON-region which corresponds to one of the cells whose ON-output duration is the largest of the cells to a rearmost position in the OFF-region, shifting by one column the remaining cell numbers in a direction where the output duration increases, and shifting the boundary between the OFF-region and the ON-region in a direction to reduce the ON-region by one and increase the OFF-region by one;

for the pattern C, performing no operation;

wherein the gate signal generation operation is implemented by generating a gate signal to put ON each of the cells whose cell number is arranged in the ON-region, and generating a gate signal to put OFF each of the cells whose cell number is not arranged in the ON-region;

wherein each of the cells is defined as being ON when the each of the cells is equal in output level to the level of +1 or the level of −1; and wherein each of the cells is defined as being OFF when the each of the cells is equal in output level to the level of zero.

* * * * *